United States Patent [19]

Katayama et al.

[11] Patent Number: 4,736,296

[45] Date of Patent: Apr. 5, 1988

[54] METHOD AND APPARATUS OF INTELLIGENT GUIDANCE IN NATURAL LANGUAGE

[75] Inventors: Yasunori Katayama, Mito; Ryosei Hiraoka, Tokyo; Hiroshi Yoshiura; Kunio Nakanishi, both of Hitachi, all of Japan

[73] Assignee: Hitachi, Ltd., Tokyo, Japan

[21] Appl. No.: 685,993

[22] Filed: Dec. 24, 1984

[30] Foreign Application Priority Data

Dec. 26, 1983 [JP] Japan ........................ 58-244011
Dec. 27, 1983 [JP] Japan ........................ 58-244624
Jan. 11, 1984 [JP] Japan ........................ 59-3027

[51] Int. Cl.⁴ .................................................. G06F 15/38
[52] U.S. Cl. ........................................ 364/419; 364/200; 434/157
[58] Field of Search ............... 364/419, 900 MS File, 364/200 MS File, 513

[56] References Cited

U.S. PATENT DOCUMENTS

| 4,270,182 | 5/1981 | Asija | 364/900 |
| 4,412,305 | 10/1983 | Yoshida | 364/419 |
| 4,475,171 | 10/1984 | Kanou | 364/419 |
| 4,502,128 | 2/1985 | Okagima et al. | 364/419 |
| 4,509,137 | 4/1985 | Yoshida | 364/419 |
| 4,586,160 | 4/1986 | Amano et al. | 364/419 |

Primary Examiner—Jerry Smith
Assistant Examiner—Kim Thanh Tbui
Attorney, Agent, or Firm—Antonelli, Terry & Wands

[57] ABSTRACT

A method and apparatus of intelligent guidance in a natural language in which the user of an information terminal apparatus is only required to input the content of a job to be executed, in a natural language which is used in usual conversation, and not in the form of the so-called command train, and in which the terminal apparatus automatically analyzes and understands the inputted content, and displays a command train required to execute the job to the user, thus, even when the user not familiar with the manner of manipulating the information terminal manipulates the terminal, he can converse with the information terminal in the natural language.

14 Claims, 29 Drawing Sheets

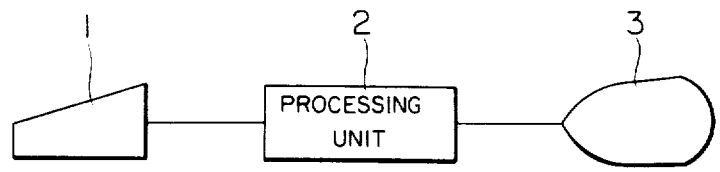
FIG. I
PRIOR ART
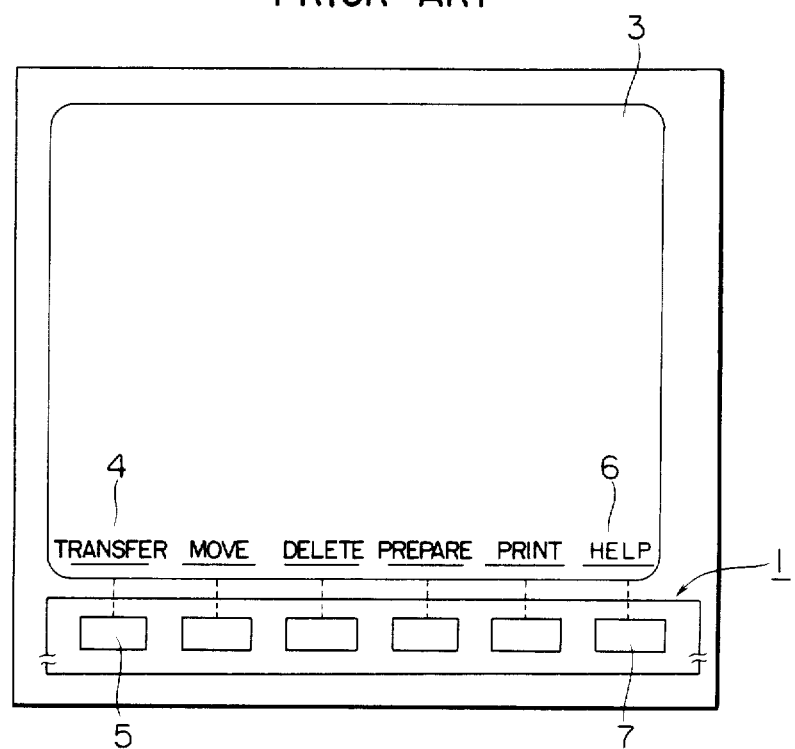
FIG. 2
PRIOR ART

FIG. 6A

図 / を / 右上 / に / 転記したい /
[ZU / O / MIGIUE / NI / TENKI SHITAI /]

FIG. 6B

| DICTIONARY NO. | KEYWORD | A PART OF SPEECH | MEANING CONDITION |
|---|---|---|---|
| I | を [O] | PARTICLE | |
| | | | |
| i | 図 [ZU : FIGURE] | NOUN | |
| i + 1 | たい [TAI] | AUXILIARY VERB | WISH |
| i + 2 | 転記する [TENKISURU : TO TRANSFER] | VERB | ⊸ —12 |
| i + 3 | に [NI] | PARTICLE | |
| i + 4 | の [NO] | PARTICLE | |
| i + 5 | 右上 [MIGIUE : UPPER RIGHT] | NOUN | INDICATE PLACE |

FIG. 6C

| PRECEDING PARTS OF SPEECH \ FOLLOWING PARTS OF SPEECH | NOUN | PARTICLE | VERB |
|---|---|---|---|
| NOUN | × | ○ | × |
| PARTICLE | ○ | ○ | ○ |

| 転記する<br>[TENKISURU:<br>TO TRANSFER] | | | |
|---|---|---|---|
| RELATION TO PREDICATE | GRAMINATICAL CONDITION | MEANING CONDITION | DEFAULT VALUE |
| SUBJECT OF ACTION | NOUN + か [GA] | OPERATOR | OPERATOR |
| | | INFORMATION TERMINAL | |
| OBJECT | NOUN + を [O] | OBJECT | — |
| PLACE | NOUN + に [NI] | PLACE | — |

| ADDRESS | KEYWORD | MEANING INFORMATION |
|---|---|---|
| 1 | オ [O] | 尾 [O:TAIL] |
| . | | |
| . | | |
| . | | |
| 17 | ガ [GA] | が [GA] |
| 18 | ガイコク [GAIKOKU] | 外国 [GAIKOKU: FOREIGN COUNTRY] |
| . | | |
| . | | |
| . | | |
| 29 | マウ [MAU] | 舞う [MAU: DANCE] |
| 30 | ヤ [YA] | や [YA] |
| 31 | ヤマ [YAMA] | 山 [YAMA: MOUNTAIN] |
| 32 | ヤマイモ [YAMAIMO] | 山芋 [YAMAIMO: YAM] |
| 33 | ヤマオク [YAMAOKU] | 山奥 [YAMAOKU: RECESSES OF A MOUNTAIN] |
| 34 | ワラ [WARA] | 藁 [WARA: STRAW] |
| 35 | ワラウ [WARAU] | 笑う [WARAU: LAUGH] |
| 36 | ヲ [O] | を [O] |

FIG. 15
(PRIOR ART)

| FOLLOWING PARTS OF SPEECH / PRECEDING PARTS OF SPEECH | -- | CASE PARTICLE | -- | TERMINATION PARTICLE | -- | VERB TERMI- NATION FORM | -- | NOUN | -- |
|---|---|---|---|---|---|---|---|---|---|
| ¦ | -- | | -- | | -- | | -- | | -- |
| CASE PARTICLE | | I | | I | | I | | I | |
| ¦ | -- | | -- | | -- | | -- | | -- |
| TERMINATION PARTICLE | | O | | O | | I | | I | |
| ¦ | -- | | -- | | -- | | -- | | -- |
| VERB TERMI- NATION FORM | | O | | I | | O | | I | |
| ¦ | -- | | -- | | -- | | -- | | -- |
| NOUN | | I | | I | | O | | I | |
| ¦ | -- | | -- | | -- | | -- | | -- |

FIG. 22A

| ITEM | CONTENT | |
|---|---|---|
| COMMAND NAME | TRANSFER ( X , Z ) | ←— 140 |
| PRECONDITION | EXIST ( X , Y )<br>EXIST ( $\phi$ , Z ) | —151 |
| DELETE LIST | EXIST ( $\phi$ , Z ) | —152 |
| ADD FORMULA | EXIST ( X , Z ) | —153 |

FIG. 22B

| ITEM | CONTENT |
|---|---|
| COMMAND NAME | DELETE ( $\phi$ , V ) |
| PRECONDITION | EXIST ( W , V ) |
| DELETE LIST | EXIST ( W , V ) |
| ADD FOURMULA | EXIST ( $\phi$ , V ) |

FIG. 28

| COMMAND NAME | DELETE ($\bar{o}$) |
|---|---|
| PRECONDITION | EXIST ($\bar{o}$, P) |
| DELETE LIST | EXIST ($\bar{o}$, P) |
| ADD FORMULA | — |

FIG. 29

| APPLIED RULE | STATE | STATE DISAPPEARED AFTER APPLICATION OF RULE | |
|---|---|---|---|
| 消去 (DELETION) | 1 | EXIST (文, 右上) (SENTENCE) (UPPER RIGHT) | 160 — 197 |
| 転記 (TRANSFER) | 2 | EXIST ($\phi$, 右上) (UPPER RIGHT) | 198 |
| ⋮ | 3 | ⋮ | |

METHOD AND APPARATUS OF INTELLIGENT GUIDANCE IN NATURAL LANGUAGE

The present invention relates to a method and apparatus for information terminal processing, and in particular, to a method and apparatus for intelligent guidance in a natural language suitable for operation of the terminal by a user who is not familiar with the manipulation method of the information terminal. In other words, the present invention relates to a system which enables the user to learn the manipulation method during conversation with the information terminal in a natural language including Japanese, Chinese and the like, and it is adaptable to all information terminals associated with computers. The term "information terminal" in the specification is used to mean an interface which deals with information interaction between humans and computers.

A conventional information terminal, as shown in FIG. 1, includes an input device 1 such as a keyboard or the like, a processing unit 2 for processing an inputted content from the input device 1, and a display unit 3 for displaying the processed content.

Further, various commands of the information terminal are, as shown in FIG. 2, displayed on the lower portion of the display unit 3 such that these commands 4 (transfer, move, . . . etc.,) can be inputted at the present status, using input buttons 5 which are disposed on the key input device 1 and correspond to respective commands 4.

In this manner, when the user of the information terminal desires to execute one of the commands 4, e.g., "transfer", the desired processing can be executed merely by depressing one of the buttons 5 of the key input device 1 corresponding to the command "transfer" 4.

Further, when the user can not understand the meaning of the command "transfer" and desires to know the method of using it, he may depress a button 7 corresponding to a command "HELP" 6, and further depress one of the buttons 5 corresponding to the command "transfer", then the content of a guide described in a manual of the information terminal is displayed.

Now, for example, consider such a situation in which, as depicted in FIGS. 3A and 3B, a map of a city is displayed on a display screen as in FIG. 3A, and the user wishes to transfer a figure 8 from a lower left portion of the city map to an upper right portion 9 shown by a broken like block on a customer card to obtain a figure 10 on the upper right portion thereof as shown in FIG. 3B.

If a condition is attached to the command "transfer" that no transfer is allowable to a portion where a character train has already been written, the user of the terminal, in order to realize the goal state shown in FIG. 3B, has to take one of the following step:

(1) to input various commands, and repeat trial and error,
(2) to obtain a solution by studying the manual closely,
(3) to request assistance from others familiar with the system, or
(4) to ask some experts in the manufacturing company as to a method of inputting the "transfer" command.
For this reason, for users who have very little experience using the terminal, the manipulation of the terminal is very cumbersome and intimidating.

It is an object of the present invention to provide a method and apparatus of terminal processing which enables the user to execute his desired processing by inputting instructions in a natural language to the user (e.g., Japanese, Chinese), and which is easy to manipulate, i.e., to provide a method and apparatus of intelligent terminal manipulation guidance in a natural language.

The present invention is characterized in that the user of an information terminal apparatus is only required to input a sentence to be executed in a natural language which is used in normal conversation, and not in the form of a series of commands, referred to as a command train, and that the terminal apparatus automatically analyzes and understands the inputted sentence, and displays a command train required to execute the operation to the user.

More specifically, the present invention is characterized in that by analyzing the natural language inputted from an input device such as a keyboard, voice input device, etc., a goal state of the information terminal by the user is recognized, and an intermediate goal state is obtained by processing a predetermined command corresponding to the goal state, and when it is ascertained that the intermediate goal state is equal to a current state of the information terminal, then there is outputted and displayed to the user a command train which instructs the user to execute reversely the predetermined command executed in the transition from the goal state to the intermediate goal state.

Further, another characteristic of the present invention resides in that a history of the information terminal is stored, that is, storing state changes of the information terminal and commands executed in effecting the state changes is performed and based on a corresponding relationship between the state changes and the commands, it is possible to output and display the manipulation history of the information terminal.

The above and other objects, features and advantages of the present invention will be apparent from the following detailed description of the preferred embodiments of the invention in conjunction with the accompanying drawings, in which:

FIG. 1 is a block diagram illustrating an arrangement of an information terminal in a conventional computer system;

FIG. 2 is a front view of a display showing an example of display of various commands in the conventional information terminal;

FIGS. 6A, 6B and 6C are tables showing examples of dictionaries used in the rough analysis processing in FIG. 5;

FIG. 12 shows an example of a dictionary memory in FIG. 9;

FIG. 15 shows an example of a conjunction matrix used in the unit word division processing system of FIG. 14.

FIGS. 22A and 22B are format diagrams showing examples of a rule base of the terminal command;

FIG. 28 is a format diagram showing an example of rule base of the terminal command;

FIG. 29 is a format diagram showing an example of the content of the history memory;

Figure 3A:
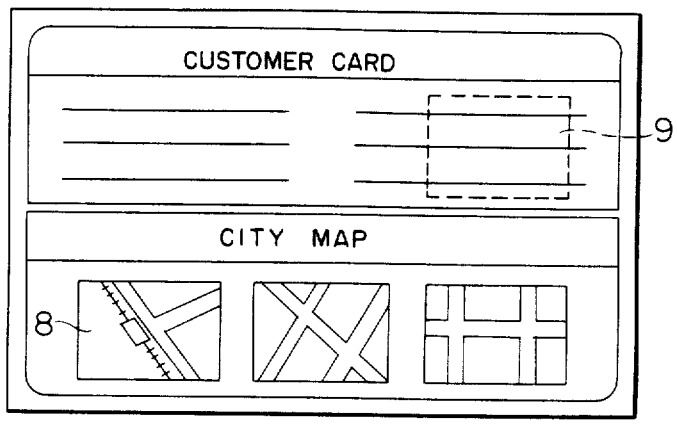
FIGS. 3A and 3B are respectively, front views of display screens showing examples of display in the conventional information terminal.
Figure 3B:
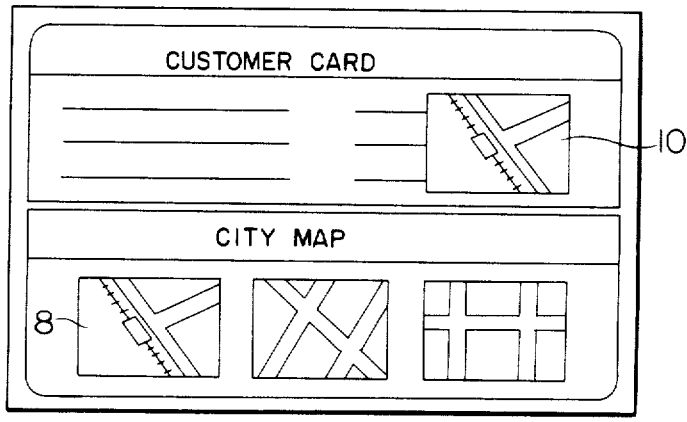
Figure 4:
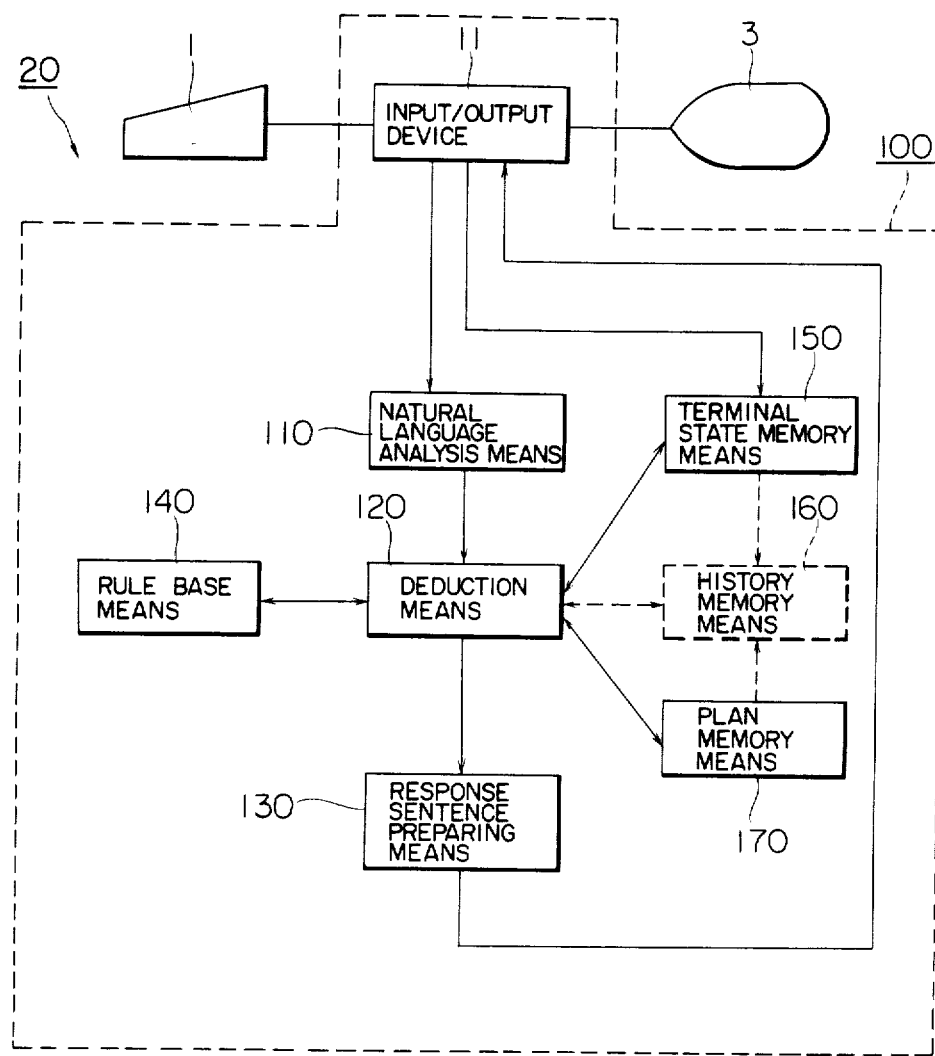
FIG. 4 is a schematic block diagram showing a general arrangement of an information terminal in one embodiment of the present invention.

With reference to FIG. 4, one embodiment of the present invention will be described. An input device 1 and a display unit 3 are identical to the ones used in a conventional information terminal. However, in this embodiment, an input sentence or a question sentence in a natural language of the user is inputted to a processing device 100.

The processing device 100 is generally comprised of the following means:

(a) an input/output control device 11 for controlling an input/output value;

(b) natural language analysis means 110 for analyzing the inputted natural language, and for transforming its meaning to an internal expression (e.g., a machine language) for the processing device 100;

(c) deduction means 120 receiving the analysis result of the analysis means 110 for deciding what input or question is inputted by the user;

(d) response sentence preparing means 130 uses the result of the deduction means 120 for generating an answer or instruction to the user;

(e) rule base means 140 for ordering, classifying and storing manipulation commands of the information terminal required by the deduction means 120 to perform the deduction;

(f) terminal state memory means 150 for storing an operation state of the information terminal 20 as an internal expression of the processing device 100, wherein as the operation state of the information terminal 20 changes, simultaneously, the operation state represented by the internal expression is also changed;

(g) history memory means 160 for storing operation states before the change, each time the content of the terminal state memory means 150 changes; and (h) plan memory means 170 for storing a train of command manipulations of the information terminal 20, which is the output of the deduction means 120.

The output of the response sentence preparing means 130 is shown to the user through the input/output control device 11 and display unit 3.

Figure 5:
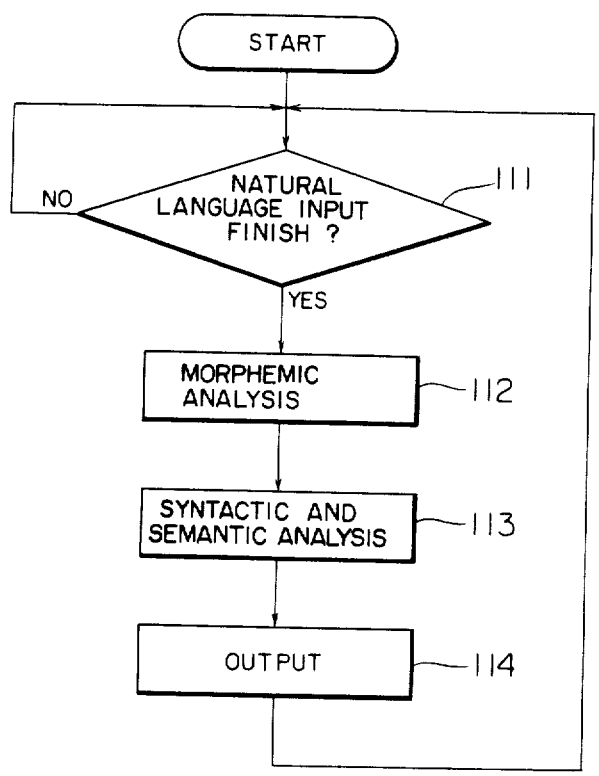
FIG. 5 is a flow chart of a processing procedure of natural language analysis carried out in the information terminal of FIG. 4.

The natural language analysis means 110 is constituted by a microcomputer or an electronic computer, and in accordance with procedures depicted in FIG. 5, executes the natural language analysis in accordance with the following steps.

Step 111 . . . A train of input characters in the natural language is divided to separate each character, and at the time of completion of the input, the control moves to the next step. Step 112 . . . A morphemic analysis processing is executed in which the input character train divided into individual characters is divided into vocabularies by retrieval of a keyword in a dictionary as shown in FIG. 6B.

Step 113 . . . A syntactic and semantic analysis is executed in which, on receiving the result of the morphemic analysis, the meaning of the input sentence is analyzed making reference to a case frame dictionary as shown in 7A.

Step 114 . . . In accordance with the result of the syntactic and semantic analysis, the input sentence is converted to a meaning structure, and output processing is executed for use in the subsequent processing. After completion of the processing in this step 114, the process returns to the step 111 for awaiting the input of a natural language character train again.

The afore-mentioned processing will be described more concretely as follows. As a concrete example, when an input character train as described in FIG. 6A, namely, " , ずをみぎうえにてんきしたい "
[zu o mi gi u e ni te n ki shi ta i]
[wish to transfer Figure to the upper left]

is inputted with kana characters (corresponding to phonetic representation) and numerals, in the morphemic analysis step 112, a vocabulary beginnig with "ず" [zu] is obtained based on a keyword of the dictionary of FIG. 6B.

When, it is found that "ず[zu]" ( ゾ [Figure]) exists among the keywords, a vocabulary corresponding to "ゾ[zu]", is looked for, and a vocabulary " ゾ [zu: figure]" is found. In the similar manner, " を [o]" "右上 [migiue: upper right]", " に [ni]", " 転記する [tenkisuru: transfer]", and " たい[tai: wish to]" are cut out.

The vocabularies "ゾ[zu: figure]" and "を[o]" are, next, correlated with a conjunction matrix in FIG. 6C. And, it is ascertained that a noun " ゾ[zu: figure]" of the preceding parts of speech and a particle " を [o]" of the following parts of speech satisfies the conjunction relationship. In this manner, the morphemic analysis processing for cutting out a vocabulary is executed.

Figures 7A, 7B:
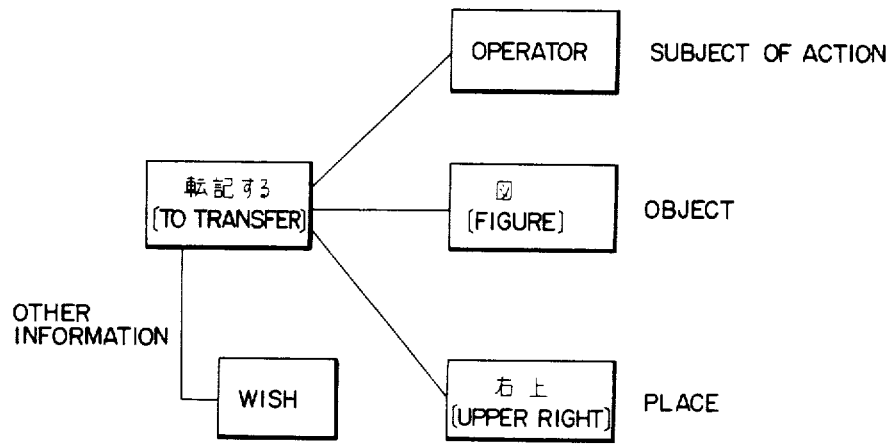
FIGS. 7A and 7B are a table and a block diagram showing examples of a case frame dictionary which is made reference to for the purpose of sentence structure meaning analysis in FIG. 5.

Following this result, a meaning condition of a predicate " 転記する
[tenki-suru: transfer]" is looked up by the dictionary of FIG. 6B, and it is found that, in accordance with the pointers 12 (FIG. 6B) and 13 (FIG. 7A), a case frame dictionary of FIG. 7A is referred to. Then, in the case frame dictionary, the result of the morphemic analysis is substituted.

In the case frame dictionary of FIG. 7A, as seen from an item indicated by the pointer 13, the subject of action requires a grammatical condition, i.e., (a noun+a particle " が[gal]"). However, since there is no correspondence in this item, in the column of default value in the frame dictionary, "operator" is selected.

Further, in FIG. 7A, since the object of the action " 転記する [tenkisuru: to transfer]" requires a grammatical condition of (noun+particle " を [o]"), based on this condition it is found that " ズ を[zu o: figure (an object)]" corresponds thereto.

Further, as a word indicating a place, by considering a grammatical condition of (noun+particle " に [ni]"), " 右上に [migiueni: to upper right]" is found to be corresponding. As a result, for the input sentence of FIG. 6A, a result of the analysis as shown in FIG. 7B is obtained.

Next, an embodiment of a morphemic analysis device for executing the processing in the step 112 will be described. This morphemic analysis device itself is utilized, in particular, a kana to Chinese character converting device, and other devices in a natural language including a data base retrieval device, an intelligent guidance system, a question and answer device and an information sampling device. In these applications, a morphemic analysis for dividing a successive train of characters into individual units having a meaning (vocabularies) is carried out.

Before describing the embodiment, a prior art technology will be described. In a conventional morphemic analysis device, all vocabularies contained in an input character train are determined by selecting from a dictionary by a two division retrieval operation (refer to "The Design and Analysis of Computer Algorithms" by A. V. Aho, J. E. Hopcroft and J. D. Ullman, issued by Addison Wesley Corporation) of a longest vocabulary beginning at a designated position of the input character train and by changing this designated position. Here, the dictionary is a memory storing vocabularies each being constituted by a minimum unit having a meaning, and the order of arrangement of the vocabularies is based on the so-called dictionary order. As the priority of the characters, the Japanese syllabary order and the alphabetical order are typical.

By means of a binary search, it can be determined whether or not a certain character train is contained in the dictionary as a vocabulary. For this purpose, a vocabulary arranged in the center of the dictionary is compared with the inputted character train, and even when a coincidence is not obtained, it is repeated to narrow the number of vocabularies in the retrieval range to one half based on a relationship in the order of vocabularies compared. It becomes clear that if a desired vocabulary exists, it can be obtained in the process of the repetition, and if it does not exist, there will be no retrieval range. According to this method, for N vocabularies, a desired result will be obtained by approximately log 2N comparisons.

Figure 8:
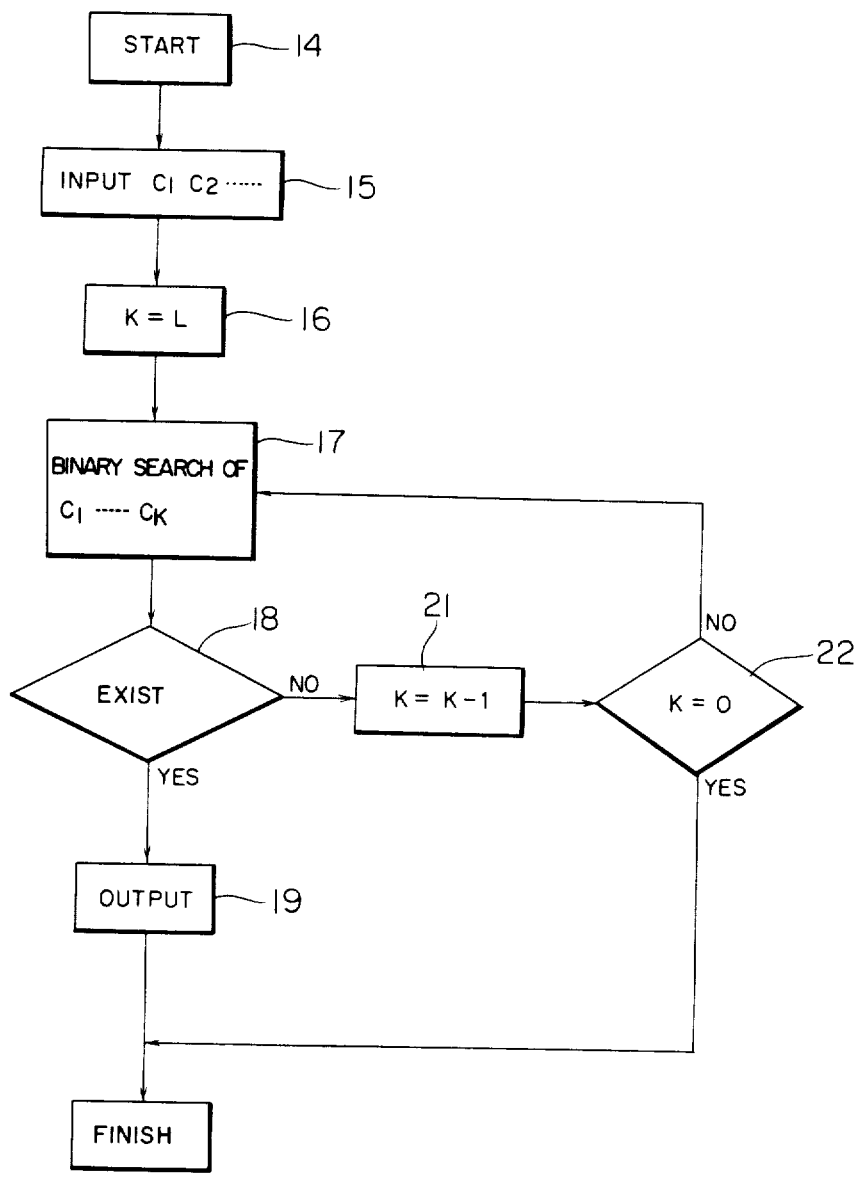
FIG. 8 is a flowchart of the morphemic analysis in the conventional method.

In applying this binary search to the morphemic analysis device, there is a difficulty in that the length of a character train can not be determined in advance. For this reason, the retrieval is carried out in accordance with the flowchart of FIG. 8.

That is, in step 17, the binary search is executed by fixing a length K of a character train to be retrieved, and if a desired vocabulary does not exist (step 18), the value of K is decreased by 1 (step 21), and the binary search of a shorter character train is carried out again.

However, according to this system, in the retrieval of a character train with the last character deleted, the processes of the retrieval thus far conducted are not entirely utilized effectively. In other words, the retrieval is carried out again from all vocabularies in the dictionary. Consequently, it takes a long time for the retrieval.

Further, if it is required to retrieve not only a vocabulary which coincides with the longest character train but other vocabularies corresponding to the second longest length and so on, much more time is needed.

In the morphemic analysis according to a longest length coincidence method, the longest vocabulary is selected when there exist a plurality of vocabularies which begin at a certain position of the input character train. However, in this case, there may be no vocabulary in the rest of the character train, which connects with the selected vocabulary. In this case, the selected vocabulary is the one which has not been included in the input character train actually, and another vocabulary must be selected. In such a situation, vocabularies having the second longest length and so on are needed.

The embodiment of the present invention solves the afore-mentioned drawbacks in the conventional system, and realizes a morphemic analysis device in which, for obtaining a vocabulary in coincidence with a character train which begins at a designated position of the input character train, vocabularies of all existing lengths are effectively retrieved, and thus the processing of dividing the input character train into units of vocabularies is executed at high speeds.

More specifically, in the embodiment, within an address range of a vocabulary which is in the dictionary and whose K−1 characters correspond to K−1 characters which begin at a designated position of the input character train, an address range of a vocabulary which corresponds to a character train beginning at the K-th character is obtained, and a vocabulary consisting of K characters and having a coincidence is outputted. By repeating such processes by increasing the value of K sequentially, a vocabulary of every length can be selected efficiently.

Figure 9:
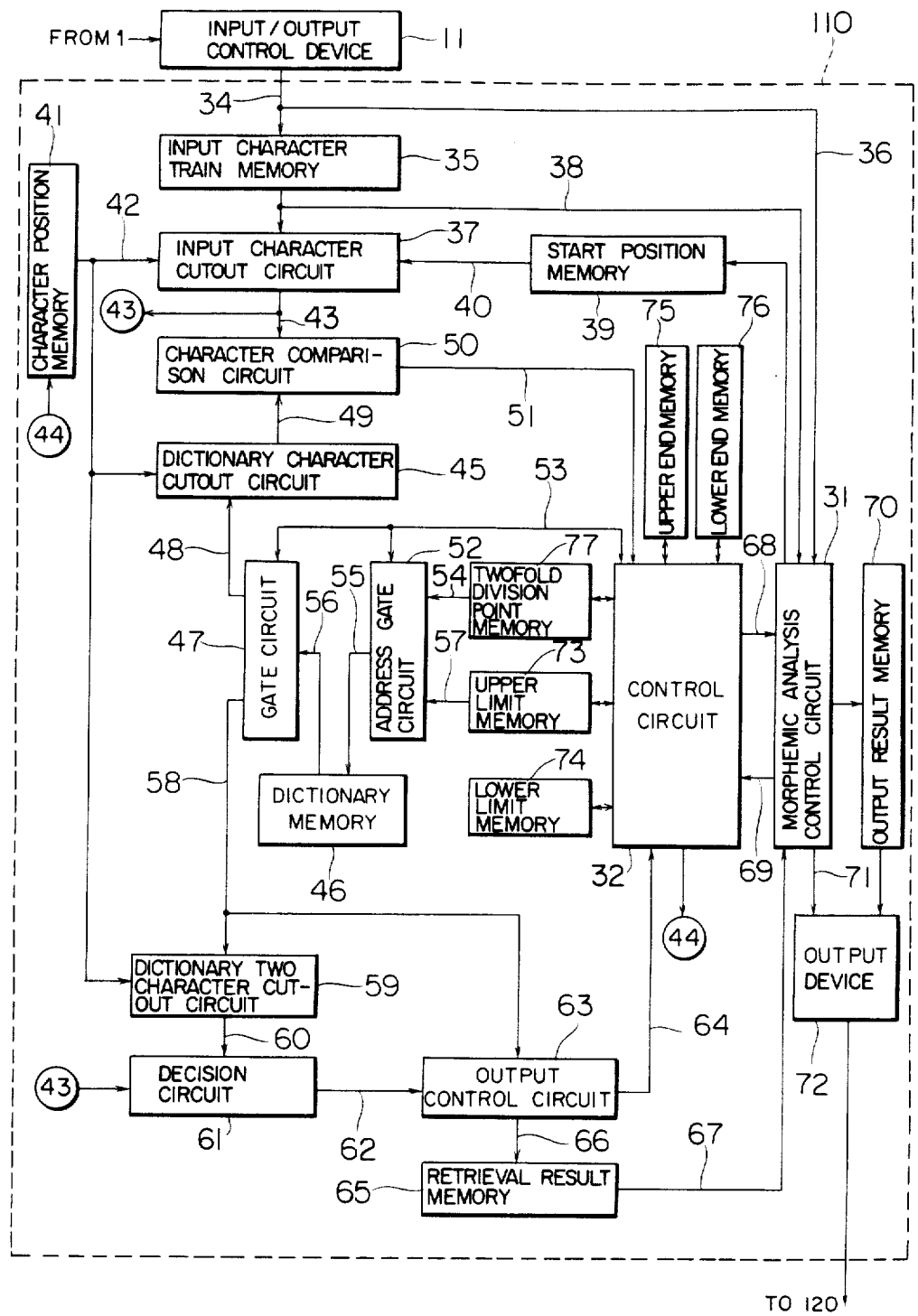
FIG. 9 is a block diagram of a morphemic analysis device of an embodiment of the present invention.

With reference to FIG. 9, one embodiment of the present invention will be described.

FIG. 9 illustrates an arrangement of a morphemic analysis device in which an input character train is divided in units of vocabularies, and dictionary data of each vocabulary is outputted.

A morphemic analysis control circuit 31 controls determination as to a conjunction relationship of vocabularies, and processing according to the so-called longest coincidence method is adopted. The longest coincidence method is a method in which if there are a plurality of vocabularies which begin at a certain position of the input character train, then a vocabulary of the longest length is selected.

A control circuit 32 controls the selection of a vocabulary from a dictionary, and sequentially calculates a value of the address of the dictionary.

Hereinafter, the processing in each section will be described in detail.

The input/output control device 11 outputs a character train inputted therein as input character train data 34 to an input character train memory 35, and outputs a start control signal 36 instructing the start of the morphemic analysis to the morphemic analysis control circuit 31. An input device 1 (FIG. 4) is constituted by a character input device such as an English character, Japanese kana character and Chinese character typewriter, or a voice and a character recognition device or the like.

The input character train memory 35 stores the input character train data from the input/output device 11, and supplies this data to the morphemic analysis control circuit 31 as input character train data 38 and to an input character cut-out circuit 37.

The input character cut-out circuit 37 takes out only one character which exists at a position corresponding to a sum of start position data 40 and character position data 42, counting the series of characters one at a time from the first character, and outputs this character as input character cut-out data 43.

A start position memory 39 stores the position occupied by one character of a vocabulary to be retrieved in the input character train data 38. The value of the position is set by the morphemic analysis control circuit 31 and is outputted as the start position data 40.

A character position memory 41 is a counter memory and performs incrementing or is reset to zero by a character position setting signal 44 from the control circuit 32, and outputs the character position data 42.

A dictionary character cut-out circuit 45 takes out from a character train of a vocabulary of dictionary data 48, an n-th character in which n corresponds to the number of characters represented by the character position data 42, and outputs the taken out character as dictionary character cut-out data 49.

A character comparison circuit 50 compares the input character cut out data 43 with the dictionary character cut out data 49 and outputs, e.g., any of "−1", "0" and "+1" as a character comparison signal 51. The comparison of the characters is determined on the basis of a relationship with respect to the order of the characters defined beforehand. That is, if the input character cut out data 43 is behind the dictionary the characters cut out data 49 in the order of character, then the character comparison signal 51 is "−1", and if in the same order, then the signal 51 is "0", and otherwise "+1". As the order relationship, an alphabetical order in English character and a Japanese syllabary order are well known. And this order relationship is based on the same relationship as that of the character train used in the dictionary memory 46.

An address gate circuit 52 and a gate circuit 47 are actuated in a linked relationship by a gate control signal 53 from the control circuit 32. If the gate control signal is "0", the address gate circuit 52 outputs two-division point data 54 as an address 55, and the gate circuit 47 outputs dictionary data 56 read from the dictionary memory 46 as dictionary data 48. If the gate control signal 53 is "1", upper limit data 57 is inputted to the dictionary memory 46 through the address gate 52, and the read out dictionary data 56 is outputted by the gate circuit 47 as dictionary data 58. In this instance, the gate control signal 53 becomes "1" after being processed through steps of upper limit update processing 404 and lower limit update processing 405, and otherwise "0" (refer to FIGS. 10 and 11).

A dictionary two character cut out circuit 59 outputs, with respect to a character train constituting a vocabulary of the dictionary data 58, an n-th character in which n corresponds to the number of characters from the first character of the character train to the character position data 42, and the next character following the n-th character. That is, the dictionary two character cut out circuit 59 outputs these two characters as dictionary two character cut out data 60.

A decision circuit 61 outputs as decision signals 62, a signal "−1" when the first character of the dictionary two character cut out data 60 and the input character cut out data 43 are not coincident, a signal "1" when the next character of the former is void, and a signal "0" in other cases.

An output control circuit 63 is actuated by an input of the decision signal 62. The decision signal 62 is outputted as it is as a retrieval control signal 64, and only when the decision signal is "1", the output control circuit 63 outputs the dictionary data 58 to a retrieval result memory 65.

The retrieval result memory 65 stores dictionary data 66 one by one inputted from the output control circuit 63. The stored content is made reference to as retrieval result data 67 in the morphemic analysis control circuit 31.

The morphemic analysis control circuit 31 is actuated by the start control signal 36 or a retrieval finish signal 68 described later. When the start control signal 36 is inputted from the input/output control circuit 11, the morphemic analysis circuit 31 outputs a signal "1" to the start position memory 39, and further outputs to the control circuit 32 a control signal 69 indicating the start of retrieval of a vocabulary. When the retrieval finish signal 68 is inputted from the control circuit 32, the circuit 31 determines a new vocabulary based on the retrieval result data 67 according to an algorithm of the longest coincidence method or the like, outputs the determined data to an output result memory 70, and adds a length of the new vocabulary to the content of the start position memory 39, and outputs the control signal 69. In this case, if the afore-mentioned vocabulary is the end of the input character train data 38, a finish control signal 71 is outputted.

An output device 72 is actuated by an input of the finish control signal 71, and reads out the content of the output result memory 70 to deduction means 120.

The dictionary memory 46 is a memory for storing vocabulary information, and the dictionary data 56 of a vocabulary corresponding to the inputted address 55 is outputted. The number of vocabularies contained in the dictionary 46 is denoted by N, and addresses of individual vocabularies are represented by integers from 1 to N. The order of the addresses is in conformity with a rule of order known as the order in dictionary.

Figure 10:
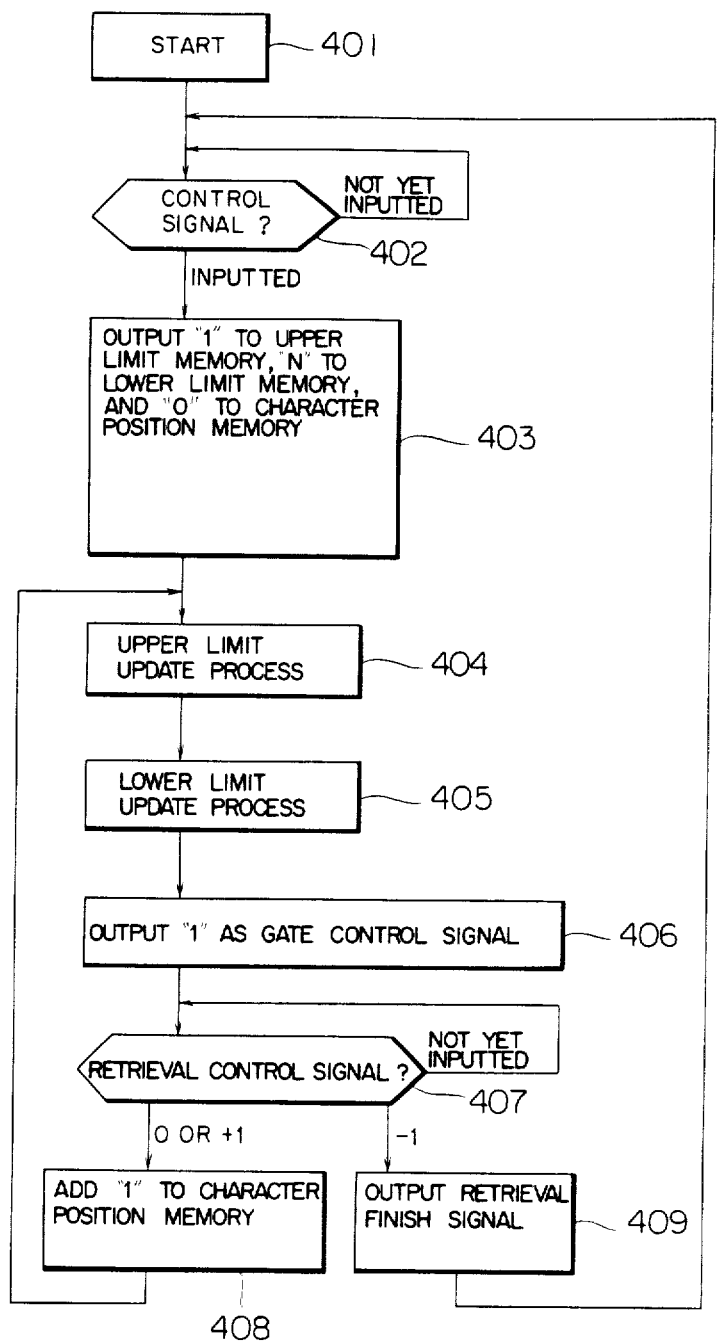
FIG. 10 is a flowchart for explaining the operation of the control circuit in FIG. 9.

The control circuit 32 is realized by a microcomputer, and the processing therein will be described with reference to FIG. 10.

The operation process is started at 401, and becomes a stand-by state 402 waiting for input of the control signal 69 from the morphemic analysis control circuit 31. Upon being inputted, in a process 403, initial value data is outputted to the memories. That is, a signal "1" is outputted to an upper limit memory 73, a signal "N" to a lower limit memory 74, and a signal "0" to the character position memory 41. Here, N is the total number of vocabularies contained in the dictionary memory 46.

After initialization of the memories, upper limit update process 404 and lower limit update process 405 are carried out. In these processes, a character next to the one indicated by the character position data 42 is correlated with a vocabulary whose address is within a range between the upper limit data and the lower limit data, and a range of addresses coincident with the corresponding character of the input character train data 34 is obtained. Processes 404 and 405 will be described later.

In process 406, a signal "1" is outputted as the gate control signal 53. By controlling the address gate circuit 52 and gate circuit 47, the retrieval control signal 64 is awaited in a stand-by state 407.

If the retrieval control signal 64 is "0" or "+1", then "1" is added (408) to the character position memory 41, and the upper limit update process 404 is re-executed. If the control signal 64 is "−1", the retrieval finish signal 68 is outputted (409), and the control signal 69 is awaited in the await state 402.

Figure 11:
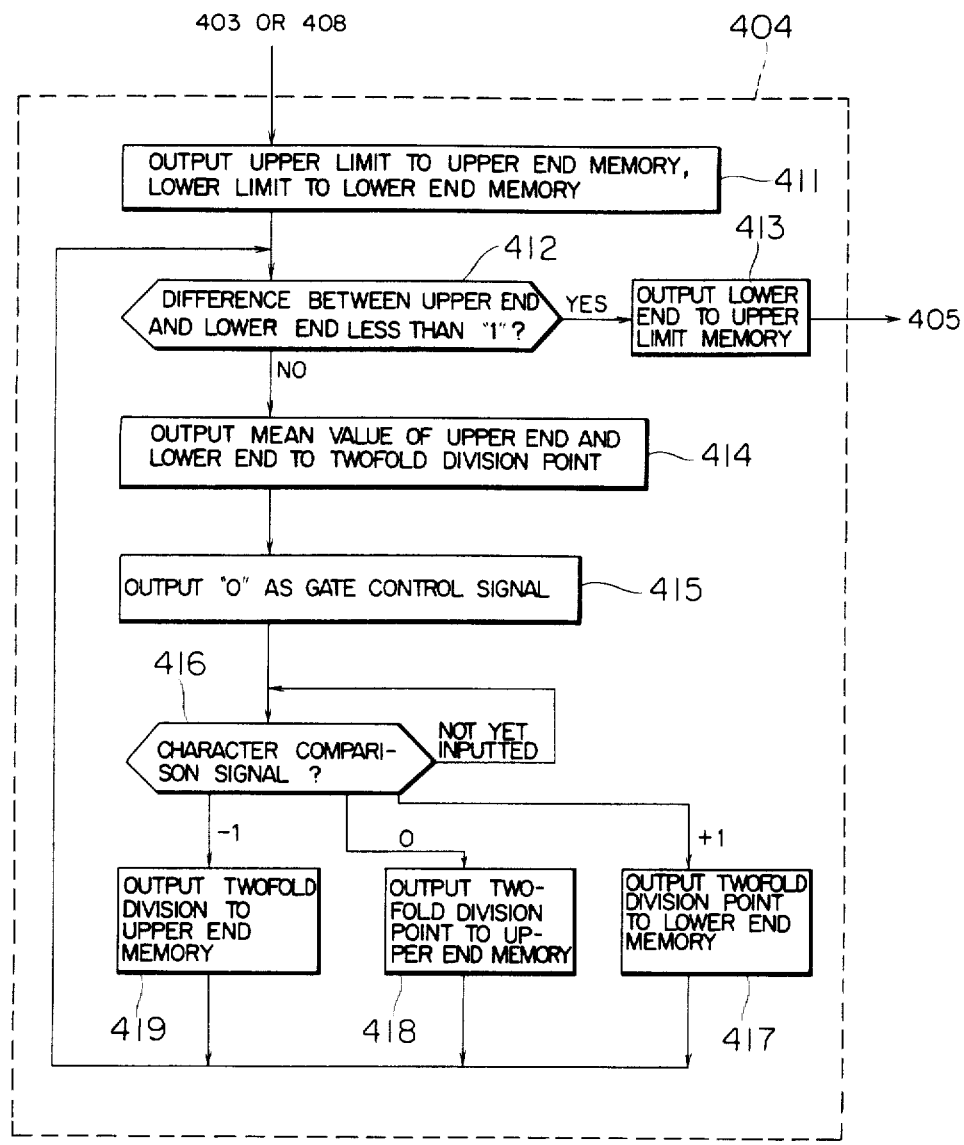
FIG. 11 is a flowchart for explaining in detail the upper limit update processing in FIG. 10.

Next, the upper limit update process 404 will be described referring to FIG. 11.

Firstly, in a process 411, upper end memory 75 and lower end memory 76 for indication of the range of the binary search are respectively initialized by the upper limit data and lower limit data.

Next, making reference to upper end data and lower end data (412), if the difference is "1", a process 413 outputs the lower end data to the upper limit memory 73, and finishes the upper limit update process 404. However, if the above conditions are not satisfied, the retrieval is carried out in the following processes.

In a process 414, a mean value of the upper end data and the lower end data is obtained, and this mean value is outputted to the twofold division point memory 77. Then, a signal "0" is outputted as the gate control signal 53 (415), and becomes an await state 416 for the character comparison signal 51.

After inputting of the character comparison signal 51, the value thereof is decided. When the value is "+1", twofold division point data is outputted to the lower end memory 76 (417), and otherwise, is outputted to the upper end memory 75 (418, 419), and executes the process 412 again.

Further, the lower limit update process 405 is the same as the upper limit update process 404 except the following two points:

(1) Instead of the process 413, the upper end data is outputted to the lower limit memory 74.

(2) In the process 418, output is to the lower end memory 76.

Next, the operation of the embodiment will be described by way of a concrete example. Now, by the use of the dictionary memory 46 of FIG. 12, obtaining an output composed of a mixture of Japanese kana and Chinese characters corresponding to an input character train " ヤマオクニオニガシマウ
[ya ma o ku ni o ni ga shi ma u]" will be considered.

The morphemic analysis control circuit 31 receiving an input of the start control signal 36, outputs "1" to the start position memory 39, and outputs the control signal 69.

Upon detection of the input of the control signal 69, the control circuit 32 outputs as initial values, respectively "1" and "36" to the upper limit memory 73 and the lower limit memory 74, and a value "0" to the character position memory 41.

Following this, the processes 411, 412 and 414 are executed as described in the following, and a value "18" is stored in the twofold division point memory 77. Next, as the gate control signal 53, a signal "0" is outputted.

The address gate circuit 52 which received the gate control signal 53, inputs the value "18" as the twofold division point data 54, and outputs this data to the dictionary memory 46 as the address 55. The gate circuit 47 outputs to the dictionary character cut out circuit 45, " ガイコク\外国 [ga i ko ku \ foreign country]" which is the dictionary data 56 read out from the dictionary memory 46 at address 18.

In response to the input of the dictionary data, the dictionary character cut out circuit 45 reads out the content "0" of the character position memory 41, and cuts out a character "ガ [ga]" as the next character. This dictionary character cut out data 49 is inputted to the character comparison circuit 50, and compared with a character "ヤ [ya]" of the input character cut out data 43 inputted from the input character cut out circuit 37. Since the character "ヤ [ya]" precedes the character "ガ [ga]" in the character order, the character comparison signal 51 is "−1".

As a result of evaluation 416 of the value of the character comparison signal, in the process 419, a value "18" of the twofold division point data is outputted to the upper end memory 75.

In a similar manner, when the upper end is "29" and the lower end is "30", it proceeds to the process 413, and the value "30" is outputted to the upper limit memory 73.

Following this, in the lower limit update process 405, a value "33" is outputted to the lower limit memory 74. As a result of this, the first character of four vocabularies from "30" to "33" is " ヤ [ya]" and this character coincides with the first character of the input character train.

Next, dictionary data " ヤヤ (particle) [yaya]" having an address corresponding to the value "30" of the upper limit data 57 is inputted to the dictionary two character cut out circuit 59. As a result, " ヤ □[ya□]" is obtained. When this result is inputted to the decision circuit 61, a signal "1" is outputted as the decision signal 62, and by the output control circuit 63, the dictionary data is stored in the retrieval result memory 65.

In this manner, three vocabularies of different lengths; " ヤ [ya]", "山[yama: mountain]" and "山奥 [yamaoku: recesses of a mountain]" are obtained, and these vocabularies are inputted as the retrieval result data 67 in the morphemic analysis control circuit 31. Among these, the longest vocabulary "山奥 [yamaoku]" is selected, and then a value "5" is outputted to the start position memory 39, and retrieves a vocabulary which connects with the vocabulary "山奥 [yamaoku]".

Figure 13:
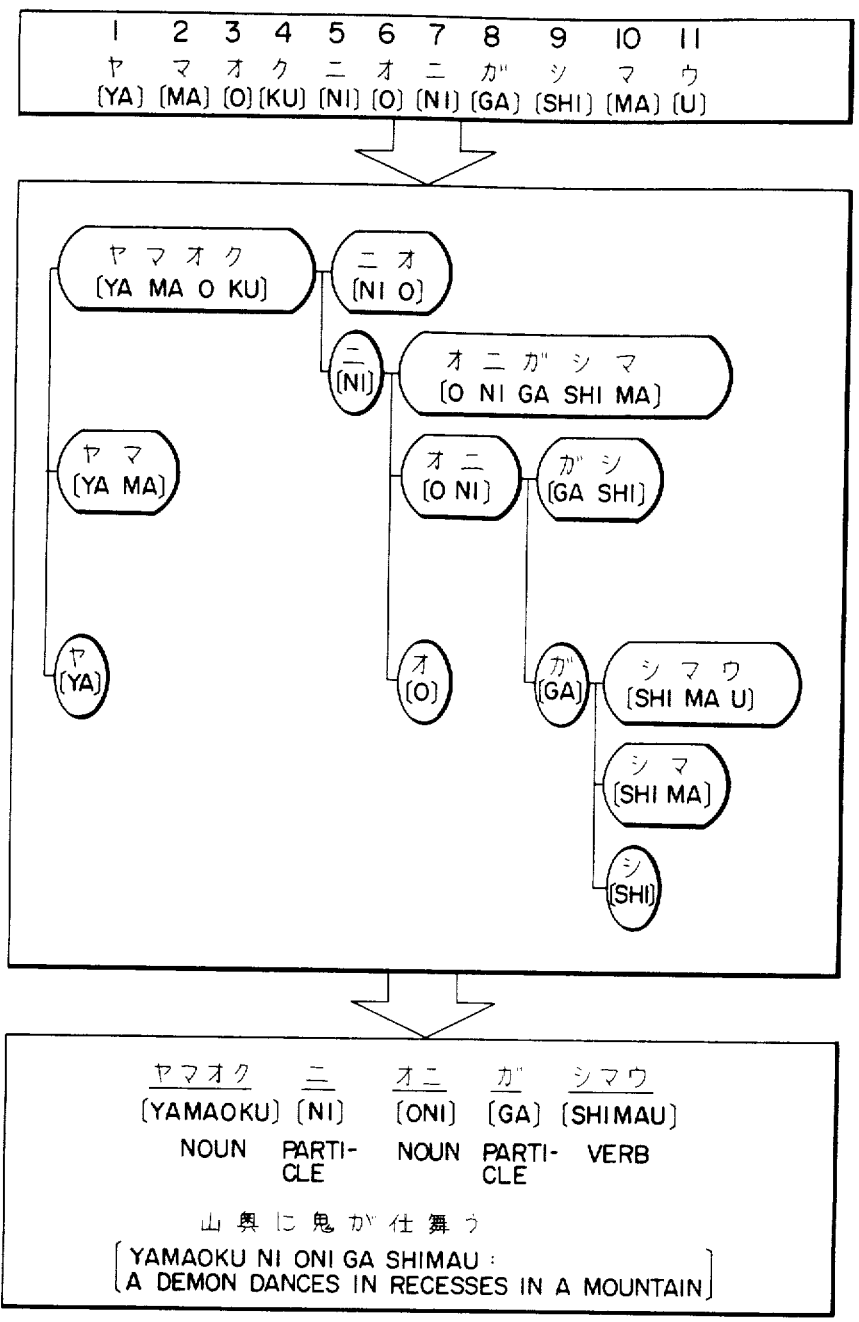
FIG. 13 shows a concrete example of the morphemic analysis.

Finally, a sentence composed of a mixture of kana characters and Chinese characters, i.e., "山奥に鬼が 住まう [yamaoku ni oni ga shimau: a demon dances in recesses in a mountain]" is outputted from the output device 72 (refer to FIG. 13.)

In the embodiment, there are advantages that the dictionary retrieval is carried out at higher speeds, and vocabularies of various lengths are obtained without fault. In particular, in the process 407, if the content of the retrieval control signal 64 is detected as being "−1", then it can be determined that there is no vocabulary which has a length of characters corresponding to a value of the character position memory 41 and which is included in the input character train. For this reason, the condition for finishing the retrieval is definite, and thus there is no fault in the retrieval.

Next, there will be described an embodiment concerning a method of dividing the character train in a natural language into unit words in the natural language analysis means 110 in FIG. 4. This embodiment is particularly suitable for processing to find undefined words in the character train at high speeds.

In conventional methods of dividing into unit words, an inputted character train in a natural language is analyzed in a forward direction, that is, from the beginning to the end, and the character train is divided in unit words (Japanese Patent Laid-Open publication No. 50-150340 (1975)).

Figure 14:
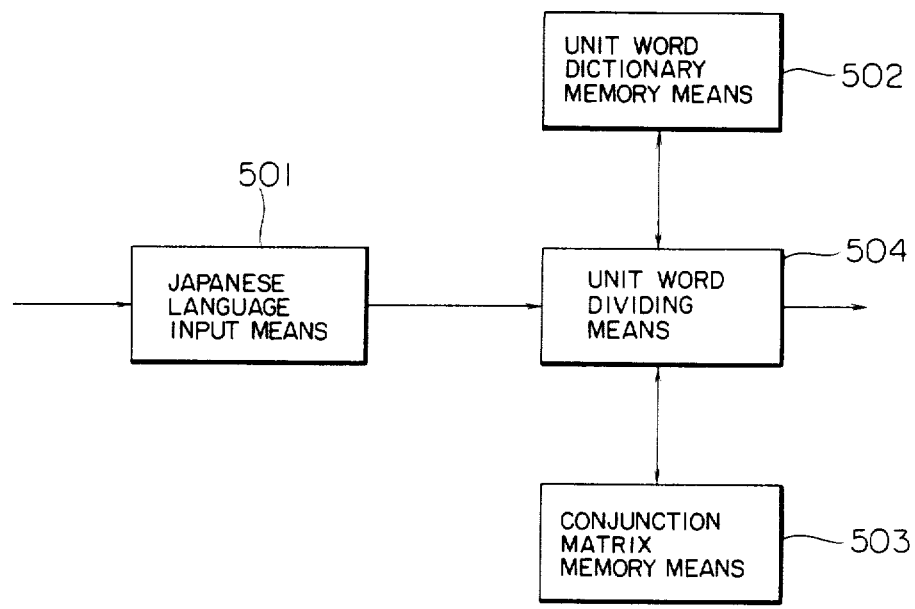
FIG. 14 is a block diagram of a general arrangement of a conventional unit word division processing system.

Hereinafter, an example of the conventional methods of dividing in unit words will be described with reference to FIG. 14. In FIG. 14, a general arrangement of a conventional unit word dividing processing system is shown, and in which a Japanese language input means 501 transforms a character train in Japanese language inputted externally into a character code train, and outputs to a unit word dividing means 504. The unit word dividing means 504 by using information from unit word dictionary memory means 502 and conjunction matrix memory means 503, analyzes the character train in Japanese transformed into the character code (or character encoded Japanese character train) in a forward direction, and divides it into unit words.

Figure 16:
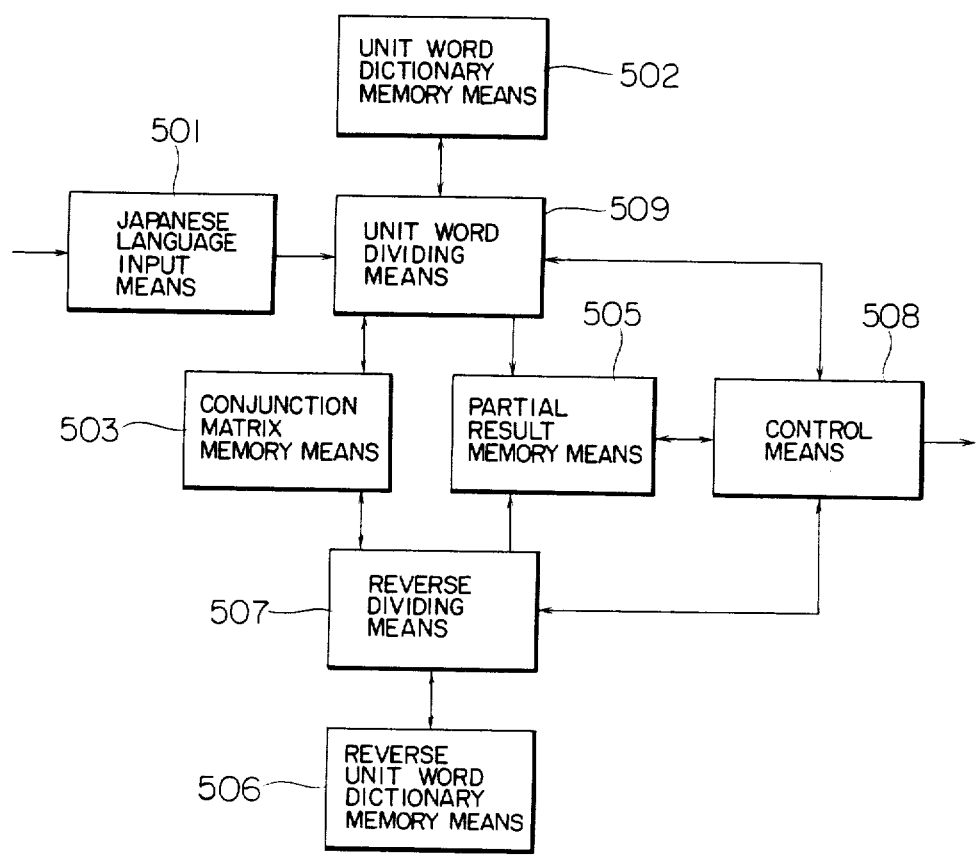
FIG. 16 is a block diagram of a general arrangement of a unit word division processing system to implement the present invention.

Referring to FIGS. 15 and 16, as the Japanese language input means 501, for example, a keyboard, a hand-written character recognizing device, a voice recognition device or the like is used.

Next, a unit word dictionary memory means 502 stores a unit word dictionary consisting of keywords and parts of speech. For example, an IC memory, disk, magnetic tape, etc., are used.

The conjunction matrix memory means 503 stores a conjunction matrix (which is the same as that shown in FIG. 6C previously) indicating the propriety of connections between the preceding parts of speech of unit word and the following parts of speech of unit word as shown in FIG. 15. In the figure, if an element (I. J) of the matrix is indicated as being 1 (or 0), it means that the conjunction of a part of speech in I-th row and a part of speech in J-th column is proper (or improper). For example, since the conjunction of a noun and a case particle is proper, the unit words " きょう [today]" and " から [from]" can be connected. As the conjunction matrix memory means, for example, an IC memory, disk, magnetic tape or the like is used.

Lastly, the unit word dividing means 504 by using the unit word dictionary and the conjunction matrix analyzes the character encoded Japanese language character train into the forward direction, and divides it in unit words. When the analysis is deadlocked due to the fact that an undefined word, i.e., a word not described in the unit word dictionary is included in the Japanese language character train, on the assumption that the undefined word of one character exists at the beginning of the unanalyzed portion, the analysis is resumed from the second character. If the analysis of the unanalyzed portion is successful, then it is decided that the assumption is proper, and the processing is ended. However, if again deadlocked, the assumption is cancelled, and assuming that the number of characters of the undefined word is two, the analysis is resumed from the third character. In a similar manner, until the analysis of the unanalyzed portion is successful, the number of characters of the undefined word is increased one by one.

The conventional method of dividing into unit words involves a drawback in that when an undefined word is contained in the input character train, much useless analysis is carried out, and it takes a long processing time.

As a method for avoiding this drawback, it is considered to reduce the probability of occurence of undefined words by increasing the memories and by increasing the number of items in the dictionary.

However, this method provides little advantage for the reason described hereinafter.

Generally, Japanese language character trains which are subject to the division into unit words are related to particular fields (e.g., articles in engineering fields). Hence, unit words which have a possibility to appear in the input sentence include a small number of unit words of a high frequency of occurence and a great number of unit words of a low frequency of occurence, and in the dictionary, the unit words of a high frequency of occurence are compiled. As a result, even if the unit word dictionary is expanded, the probability of occurence of undefined words is hardly reduced.

There is another method in which the number of undefined words is predicted depending on differences in types of characters. However, in case of inputting a Japanese language, for example, those portions which can be expressed by Chinese characters are frequently expressed by kana characteristics. Further, character trains which are inputted by a keyboard and are not subject to a kana to Chinese character conversion, and character trains which are inputted by a voice input device, are all expressed by the same type of characters. For this reason, this method is narrowed in its applicable range.

As described above, as far as the conventional methods of dividing into unit words are employed, these drawbacks mentioned above can not be avoided.

An embodiment is directed to a method of dividing a Japanese language character train into unit words, which method makes it possible to divide a Japanese language character train including undefined words into unit words at high speeds.

The embodiment relates to a method of dividing a Japanese language character train into unit words wherein an inputted Japanese language character train including an undefined word is character encoded, and the character encoded Japanese language character train is analyzed in a forward direction by making reference to a unit word dictionary composed of a key character train of Japanese language unit words and composed of parts of speech thereof prepared beforehand, and by making reference to a conjunction matrix indicating the propriety of conjunction between Japanese language parts of speech. Further the character train is divided into unit words, characterized in that a reverse unit word dictionary having a key character train formed by reversing the order of the key character train in the above-mentioned unit word dictionary, and a reverse conjunction matrix having a transposed matrix of the above-mentioned conjunction matrix are prepared, and at the time when the analysis in the forward direction becomes impossible, an unanalyzed portion of the character encoded Japanese language character train is analyzed in a reverse direction by making reference to the reverse unit word dictionary and the reverse conjunction matrix, and based on the result of the analysis in the forward direction and the reverse direction, the undefined word is extracted.

Hereinafter, the embodiment will be described with reference to FIG. 16. FIG. 16 shows an arrangement of a unit word dividing processing system for implementing the embodiment, and Japanese language input means 501 transforms an input Japanese language character train into a character code train, and outputs this code train to unit word dividing means 509. The unit word dividing means 509 analyzes the character encoded Japanese language character train (hereinafter referred to as a character train) by using information of unit word dictionary memory means 502 and conjunction matrix memory means 503, and stores the result of the analysis in partial result memory means 505. Control means 508 controls an analyzing direction, and cuts out an undefined word by referring to the partial result memory means 505.

The processing in each block will be described in detail.

Firstly, the Japanese language input means 501, unit word dictionary memory means 502 and conjunction matrix memory means 503 are the same in a conventional system.

Next, the unit word dividing means 509 performs the same operation as in the conventional system until the analysis reaches an undefined word portion and is deadlocked. However, at the time of the deadlock of the analysis, the unit word dividing means 509 stores in the partial result memory means 505 a unit word which has been cut out at the time the analysis progressed the furthest thus far, and stops operation. As the unit word dividing means 509, for example, a computer or the like is used.

Next, the partial result memory means 505 stores a unit word cut out in a forward analysis by the unit word dividing means 509 and in a reverse analysis by the reverse dividing means 507, and for example, an IC memory, disk, magnetic tape or the like is used for this means.

The reverse unit word dictionary memory means 506 stores a reverse unit word dictionary in which the character order in each key of the above-mentioned unit word dictionary is reversed, and for example, an IC memory, disk, magnetic tape or the like is used for this means.

Next, the reverse dividing means 507 performs the same operation as the unit word dividing means 509 with the exception that it uses the reverse unit word dictionary instead of the unit word dictionary, and with respect to the conjunction matrix, reads out a matrix element from the conjunction matrix in which a particle of the preceding unit word is put in a column and a particle of the following unit word is put in a row (reverse conjunction matrix).

Lastly, when the forward analysis by the unit word dividing means 509 finishes, the control means 508 outputs an unanalyzed portion of the input character train to the reverse dividing means 507, and when the reverse analysis finishes, outputs a remaining portion in the forward and reverse analysis as an undefined word.

Figure 17:
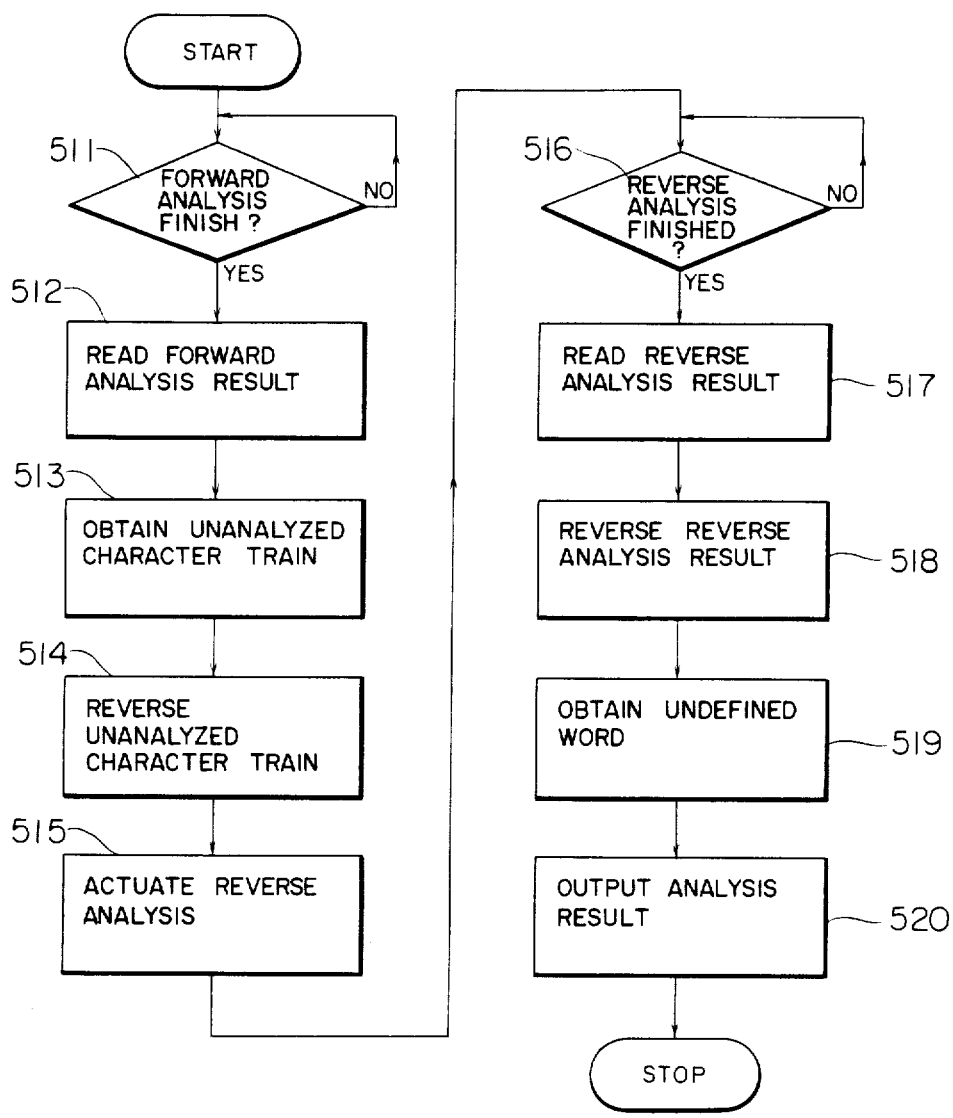
FIG. 17 is a flowchart showing the processing content by the control means in the unit word division processing system of FIG. 16.

With reference to FIG. 17, the operation of the control means 508 will be described in detail.

In step 511, the forward analysis by the unit word dividing means 509 is monitored, and when the analysis is deadlocked and finishes upon reaching an undefined word portion, a step 512 and steps following this are actuated.

Next, in step 512, a unit word which has been cut out at the time the analysis progressed the furthest is read from the partial result memory means 505.

Further, in step 513, a remaining portion in the original input character train excluding the forward analysis result read in the step 512 is made an unanalyzed character train.

Next, in step 514, the unanalyzed character train is reversed. And in step 514, by sending the reversed unanalyzed character train (hereinafter referred to as reverse input character train), actuates the reverse dividing means 507.

Next, in step 516, the reverse analysis by the reverse dividing means 507 is monitored, and when the analysis is deadlocked and finishes upon reaching an undefined word portion, a step 517 and steps following this are actuated.

And in step 517, a unit word is read from the partial result memory means 505, which unit word has been cut out at the time the reverse analysis progressed the most.

Next, in step 518, the unit word cut out in the reverse analysis is reversed to return it to a correct character train.

Further, in step 519, the character train obtained in the step 519 is excluded from the unanalyzed character train in the forward analysis, and the remainder, is made as an undefined word.

Lastly, in step 520, the cut out unit word and the undefined word are outputted.

In the conventional method, generally, supposing that a correct length (number of characters) of an undefined word is n, then (n−1) useless analyses are necessary. In contrast, in the present embodiment, only one analysis in the reverse direction is required, and hence it is possible to improve to a great extent the speed of the unit word dividing processing of a natural language character train containing undefined words.

Figure 18:
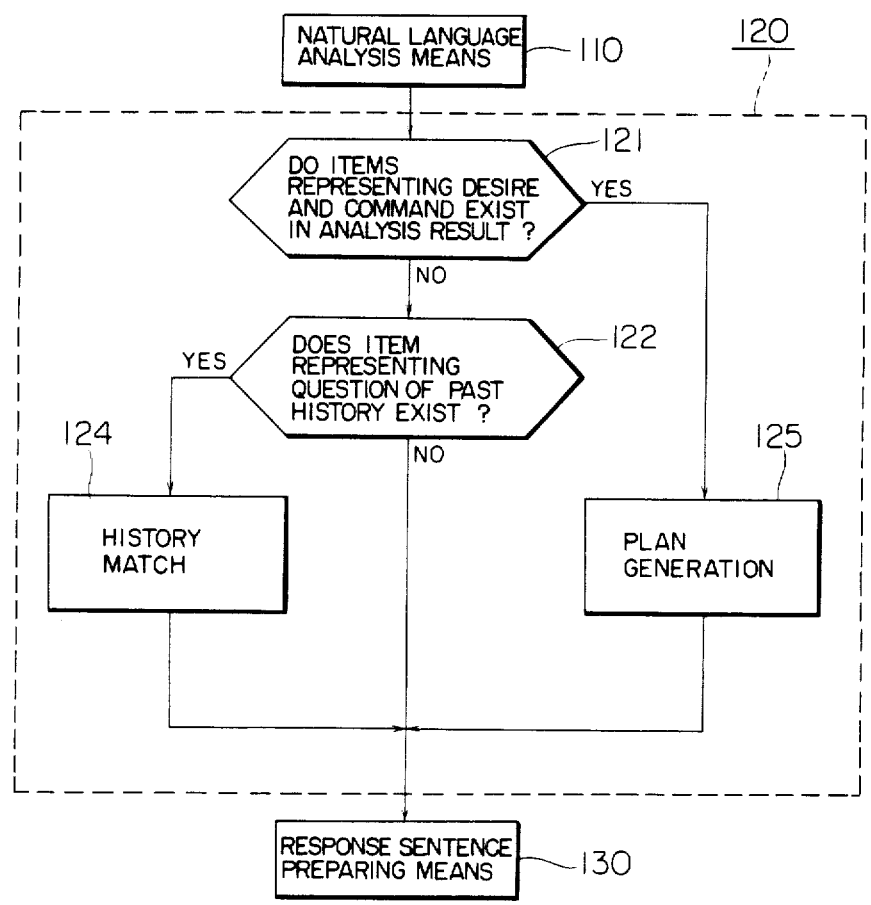
FIG. 18 is a flowchart showing the procedure of the deduction processing in FIG. 4.

The output of the natural language analysis means 110 obtained as described in the foregoing is supplied to the deduction means 120, and processed as illustrated in FIG. 18.

That is, with reference to the "other information" in the output of FIG. 7B, it is decided whether items representing a wish and a command exist in the output or not (step 121).

If there are items representing the wish and the command, it is decided that this is plan generation, and proceeds to step 123, and if these items are not present, proceeds to the next step 122.

In the step 122, it is decided whether an item representing a question of a past manipulation history exists in the "other information" or not. In the result, if the question exists, the process proceeds to a history correlation step 124, and otherwise proceeds to a step 130 to execute a response sentence preparation.

Figure 19:
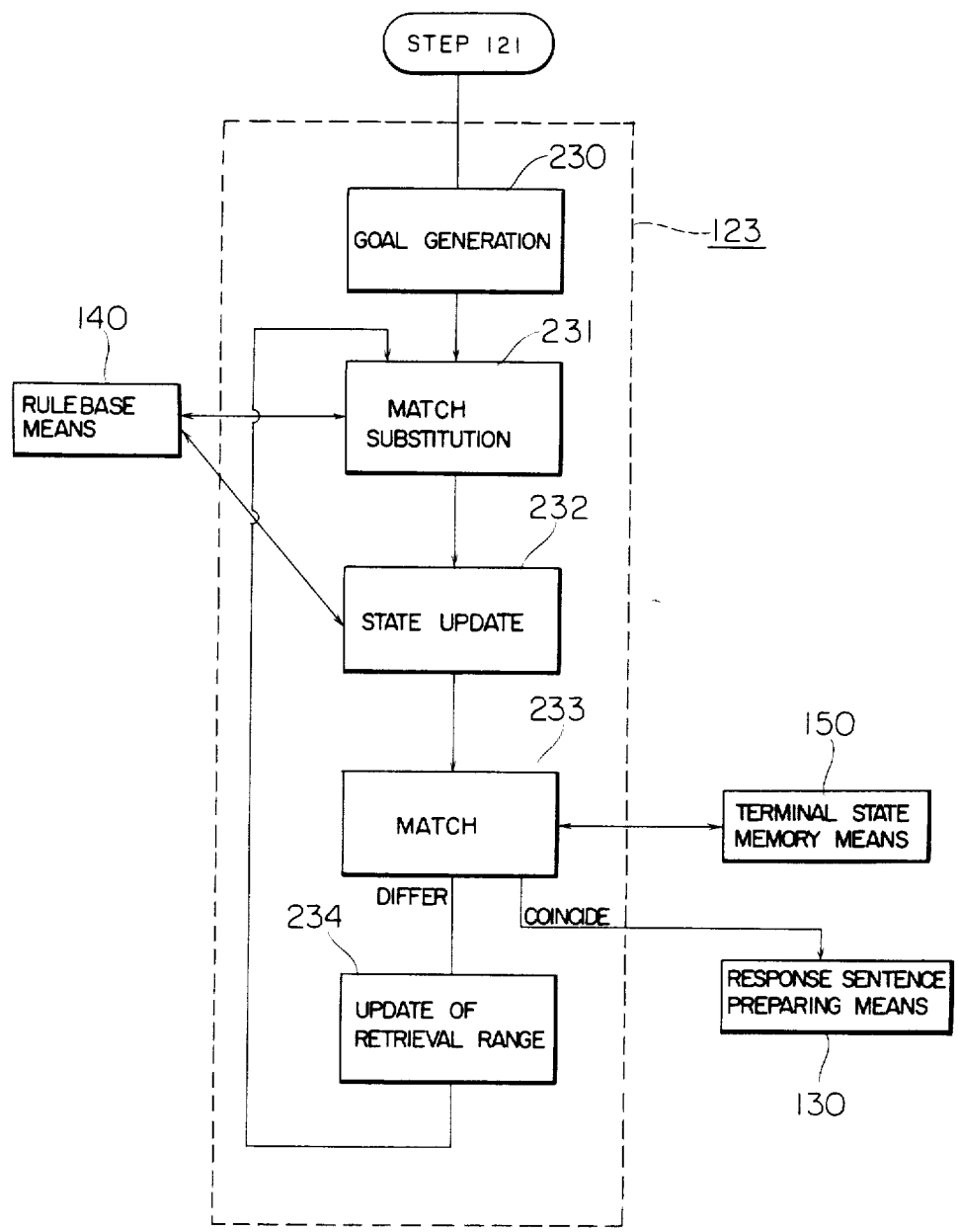
FIG. 19 is a flowchart showing the processing procedure of the plan generation in FIG. 18.

The plan generation step 123 includes, as shown in FIG. 19, the following processing procedures.

Figure 20:
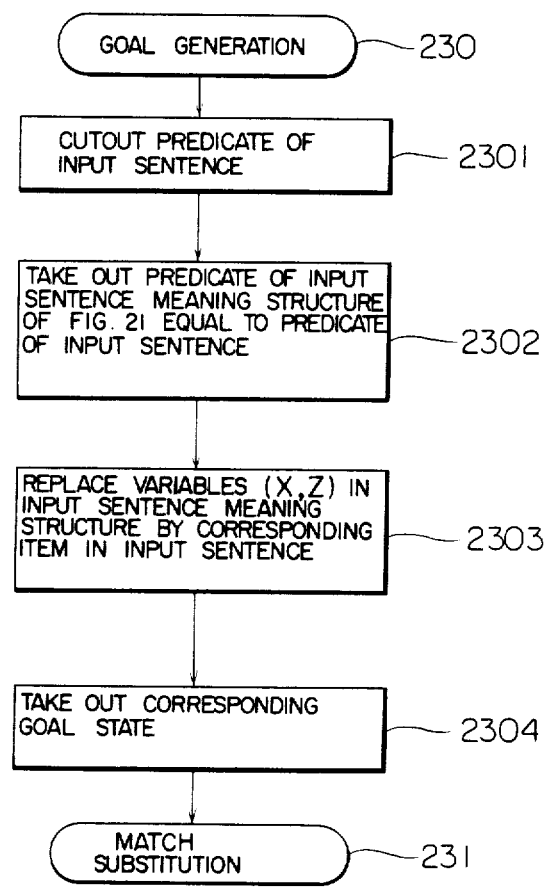
FIG. 20 is a flowchart showing a processing procedure of the goal generation in FIG. 19.

(a) Step 230 of generating a goal state (FIG. 20 shows in detail).

Figure 23:
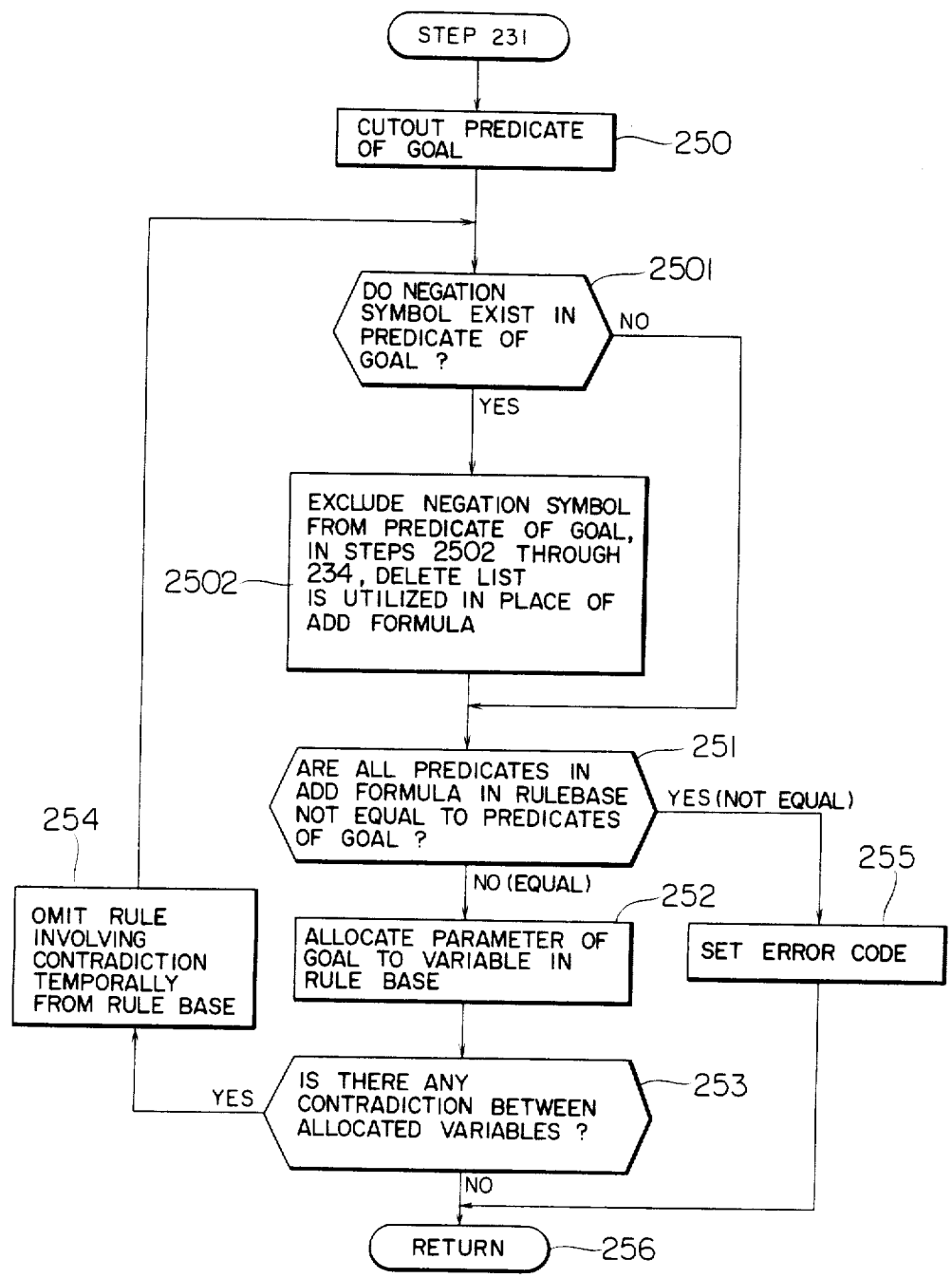
FIG. 23 is a flowchart showing an example of processing procedure of the match substitution in FIG. 19.

(b) Step 231 of match substitution (FIG. 23 shows in detail).

(c) Step 232 of state updating in which by using the result of match substitution, a state previous to applying a command (intermediate or subgoal state) of the terminal produced the goal state, is obtained from a rule base of a command of the terminal shown in FIGS. 22A and 22B in accordance with a procedure described later referring to FIG. 24.

(d) Step 233 of match in which it is determined whether an intermediate or subgoal state is equal to the content of a terminal state memory 150 representing a current state or not, and when it is equal, processing means 130 for generating a response sentence is actuated to execute.

(e) Step 234 for processing in which when the result of the decision in the step 233 indicates it is not equal, a retrieval range is updated so that the same place is not retrieved again.

FIG. 20 is a flowchart showing a processing procedure to generate a goal state of plan generation based on the analysis result of the input sentence described earlier with reference to FIG. 18, and this flowchart includes the following steps.

(a) Step 2301 of cutting out a predicate of the input sentence (in the earlier example, "転記する[tenkisuru: transfer]" is cut out).

Figure 21:
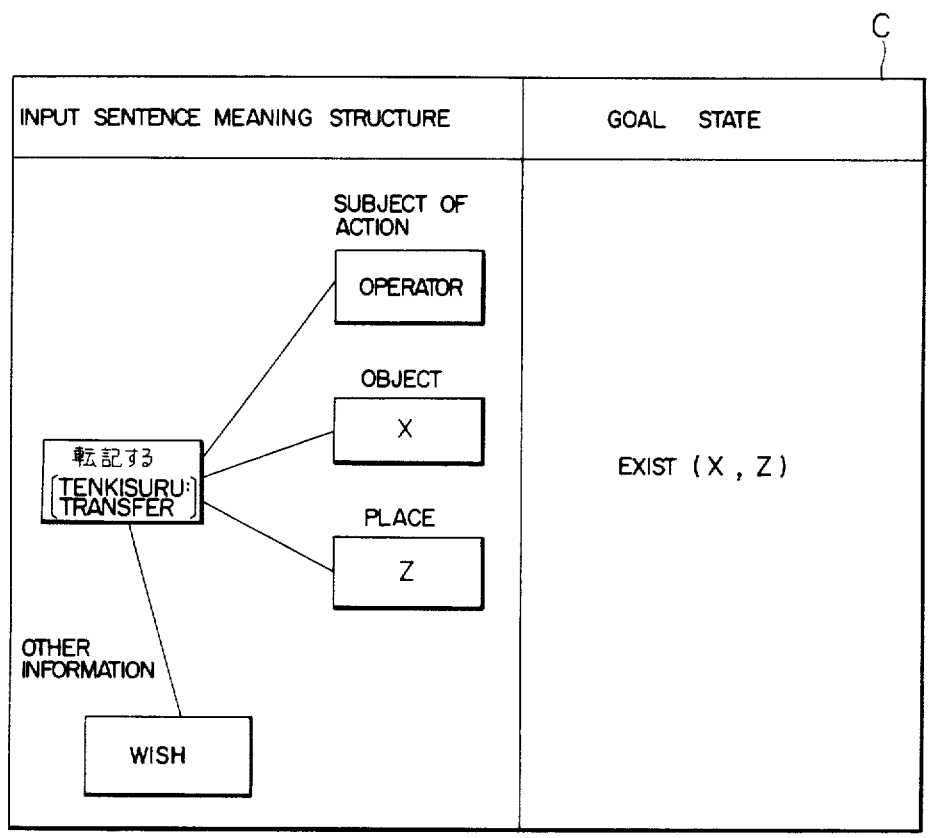
FIG. 21 shows an example of memory content indicating a correspondence between an input sentence meaning structure and a goal state.

(b) Step 2302 in which the cut out predicate is matched with a correspondence table of a pre-stored input sentence meaning structure and a goal state as shown in FIG. 21, and among the predicates of the input sentence meaning structure, a predicate equal to the predicate " 転記する
[tenkisuru: transfer]" cut out in the step 2301 is searched for.

(c) Step 2303 in which for variables such as X and Z in items in the correspondence table (FIG. 21), in accordance with a correspondence relationship with items in the input sentence, constants are substituted or replaced (in the example, substitutes " ⋎ [Figure]" for X, and " 右上 [upper right]" for Z).

(d) Step 2304 in which the result of the substitution in the previous step is taken out from a goal state at C in FIG. 21 (in this instance, in FIG. 21, goal state column, a state "exist ( ⋎ [Figure], 右上 [upper right])" is taken out.

FIGS. 22A and 22B respectively show examples of rule bases of terminal commands. A state in which a terminal command can be executed is generally limited, and a precondition defines a condition-based on which the command can be executed.

Further, by executing the command, a state which disappears from the precondition is a delete list, and on the other hand, a newly appearing state as a result of the execution of the command is an add formula.

In the earlier example of sentence, in the command instructing to transfer X (e.g., " ⋎ [Figure]") to Z (e.g., "右 上[upper right]"), a content 151 "X (Figure) exists in Y (an arbitrary position within the display screen), and a vacant area (φ) exists in Z (upper right)" is the preconditions to execute the transfer.

Further, a delete list 152 in FIG. 22A indicates a content that as a result of execution of the transfer processing, "a state that 'an vacant area exists in Z' disappears". And, further, a new state that "X exists in Z" is indicated by an add formula 153 in FIG. 22A.

These command bases are used in the steps 231, 232, etc., in FIG. 19. For example, suppose that " ⋎ [Figure]"is substituted for a variable X, and " 右上 [upper right]" is substituted for a variable Z, then the command name "transfer (X, Z)" in FIG. 22A represents that "to transfer Figure [ ⋎ ] to upper right [右 上]".

In order to execute such transfer command, the following conditions, that is, at any place (since any place may be selected, the variable Y remains as it is), " ⋎ [Figure]" exists, i.e., "exist ( ⋎ [Figure], Y)" and further a place to which this figure is to be transfered is vacant, i.e., "exist (φ, 右上 [upper right])" are two preconditions.

And, after execution of the command, the state "exist (φ, 右上 [upper right])" disappears, and instead thereof, a state "exist ( ⋎ [Figure], 右上 [upper right])" is generated. In order to indicate these situations, the delete list and the add formula are stored.

As will be apparent from the description in the foregoing, in order to generate a state equal to the add formula, the precondition must be properly established. Further, the delete list, as will be described later, is stored in the history memory 160 together with a change in state of the information terminal each time the state changes.

FIG. 23 shows a processing procedure in the match substitution step 231 utilizing the technique described above. As will be seen from the figure, the match substitution step consists of the following processing procedures:

(a) Step 250 in which a predicate portion "exist (X, Z)" of the goal state (FIG. 21, at C) obtained in the goal generation processing step (FIG. 20, step 2304) is cut out. Further, this processing, in a LISP (LIST processor) language, can be realized by using "CAR" (a command to take out only a head portion of a list) or "CDR" (a command to take out other portions than the head portion of a list) or the like.

(b) Step 2501 of processing in which it is decided whether a negation symbol exists at the head of the predicate cut out in the previous step 250 or not, and if the symbol exists, the next step 2502 is made to be executed, and if the negation symbol does not exist, a step 251 is made to be executed.

(c) Step 2502 in which when the negation symbol exists at the head of the predicate, a portion formed by excluding the negation symbol from a predicate portion of the goal is made a new goal state, and at the same time, in the course of processing from this step through step 234, if an item of an add formula appears, it is interpreted by replacing it by a delete list.

Further, this processing can easily realized, for example, by substituting an add formula used in the plan generation step 123 for a variable, and at the time of execution of this step 2502, by replacing a value of the variable by a delete list.

(d) Step 251 of processing in which it is decided whether the predicate cut out in the previous step 250 is equal to a predicate of either of the add formulas of the rule bases (FIGS. 22A and 22B) or not, and if it is equal thereto, a step 252 is made to be executed, and if it is not equal to the predicate in either of the rule bases, a step 255 is made to be executed.

(e) Step 252 in which when the predicate is equal, a parameter of the goal is substituted for a variable of the corresponding predicate in the rule base.

(f) Step 253 in which it is decided whether any logical contradiction arises between variables as a result of the substitution of the parameter of the goal, and if there is a contradiction, the processing of a step 254 is made to be executed, and if there is no contradiction, a step 256 which returns to the main processing is made to be executed.

(g) Step 254 in which as a result of the decision in the step 253, if the contradiction has arisen, the rule is temporally omitted from the rule base, and the control is passed to the previous step 251.

(h) Step 255 branched from the step 251, and after setting an error code, returns to the main processing.

Figure 24:
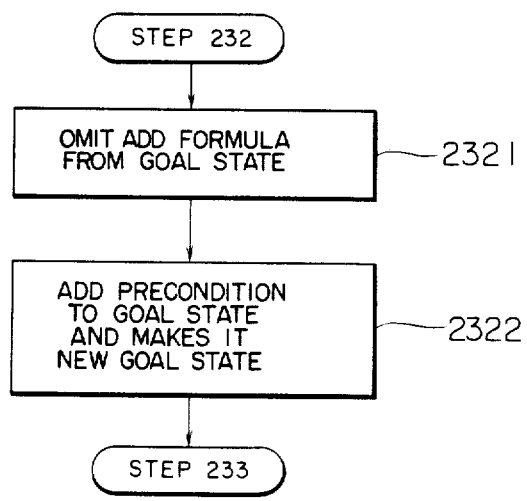
FIG. 24 is a flowchart showing a processing procedure of the state update in FIG. 19.

FIG. 24 is a flowchart showing the detail of the state update processing step 232 in FIG. 19.

In step 2321, the add formula is omitted from the state C in FIG. 21. This is, a state preceding by one step of processing to reach the goal state is temporally produced.

In step 2322, add to the goal state a precondition, and a state obtained as a result of this is made a new intermediate goal state.

Following this, in the match step 233 in FIG. 19, as described earlier, the intermediate goal state is compared and matched with the current state of the terminal, and if both states do not coincide, an intermediate goal state preceding further by one step of processing is produced when the processing procedure returns again to the state update step 232.

If the intermediate goal state produced in this manner coincides with the current state of the terminal, by following in turn the intermediate goal states thus far produced, and by sequentially executing the add formulas, the goal state can be reached from the current state of the terminal.

The operation of the present invention arranged as described in the foregoings will be described by way of a concrete example with reference to FIG. 25.

Figure 25:
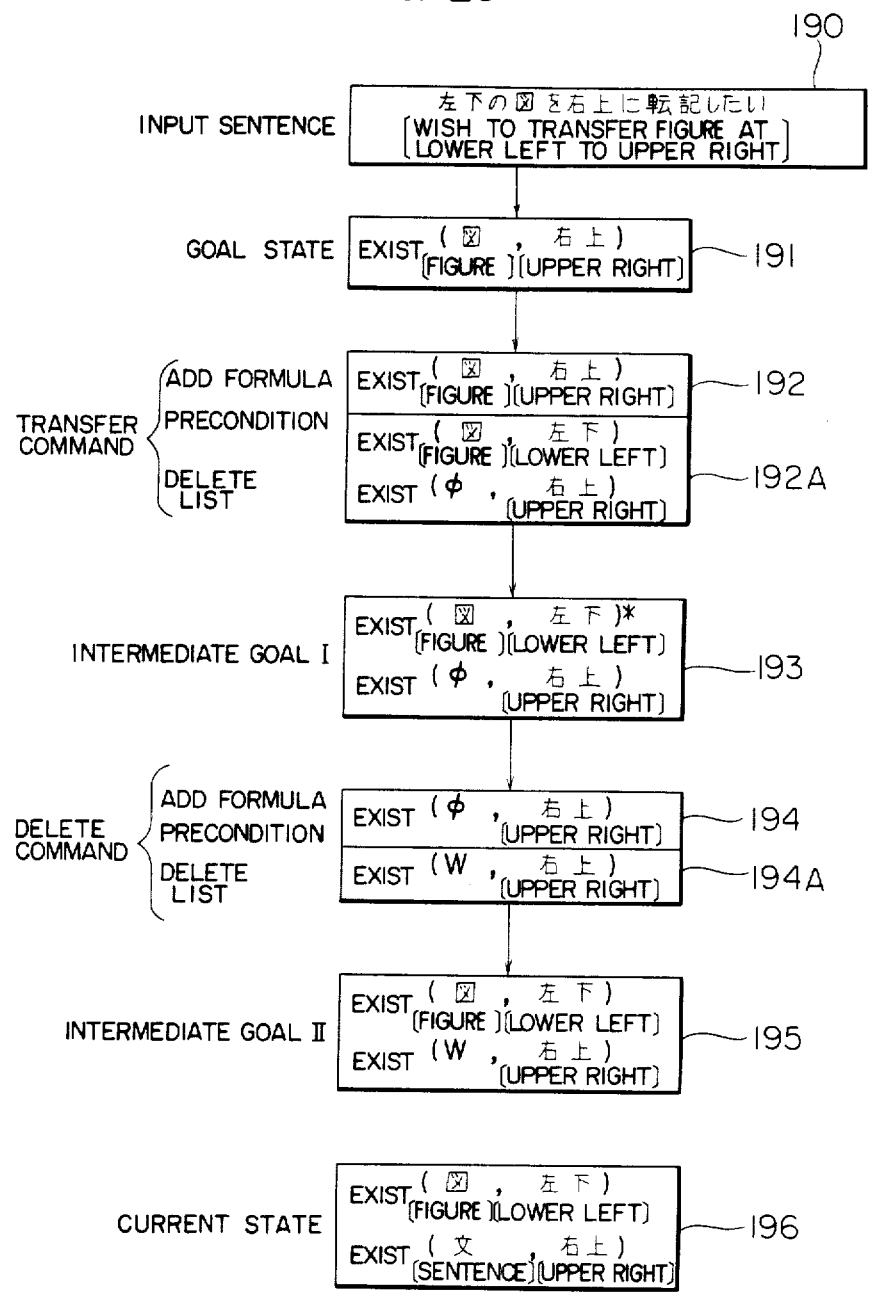
FIG. 25 is a state diagram for explaining a concrete example of information terminal processing in the present invention.

When an input sentence 190 shown in FIG. 25, namely, " 左下の図を右上に 転記したい [hidarishita no zu o migiue ni tenki shitai: wish to transfer Figure at lower left to upper right]", is inputted, the natural language analysis means 110 divides this into vocabularies, and in the goal generation step 230 (FIG. 19) the deduction means 120 generates a goal state 191 "exist 図 [Figure], 右上 [upper right])".

This goal state 191 is compared with the predicate of the add formula in the rule base 140 (FIG. 22A), and if no equal predicate (e.g., the add formula 153 "exist (X, Z)" in FIG. 22A) is found, in the match substitution step 231, each variable is substituted, and checked as to whether there is a contradiction in each variable or not.

In the case of this example, in the add formula 153 in FIG. 22A, when substituting " 図 [Figure]" for the variable X, and "右上 [upper right]" for the variable Z, then a formula 192 in FIG. 25 is obtained. And it is understood that the add formula 192 obtained as the result of the substitution is equal to the goal state 191.

As described in the foregoing, since the state reached after execution of the command of transfer corresponds to the add formula, a precondition and a delete list 192A representing a state before execution of this command becomes the next goal state, that is, an intermediate goal 193 "exist ( 図 [Figure], 左下 [lower left]); exist (φ, 右上 [upper right)]".

This processing corresponds to the state update steps 232, 2321 and 2322 in FIGS. 19 and 24.

Next, by the procedure of the match step 233 in FIG. 19, the intermediate goal I 193 is compared with a current state 196, namely, "exist ( 図 [Figure], 左下 [lower left]); exist ( 文 [sentence], 右上 [upper right])". As a result, it is determined that in the intermediate goal I 193, the state marked *, namely, "exist ( 図 [Figure], 左下 [lower left])" coincides, and that the condition is satisfied.

However, the other state "exist (φ, 右上 [upper right])" does not coincide, and the condition is not satisfied. Hence, after execution of the retrieval range update step 234 is FIG. 19, the match substitution step 231 is executed again.

Consequently, since the match with the predicate in the add formula "exist (φ, V)" of the delete command shown in FIG. 22B can be achieved, by substituting "右上 [upper right]" for its variable V, a state 194 of the delete command, namely, "exist (φ, 右上 [upper right])" is obtained.

In this instance, since a variable W in the precondition and delete list 194A, namely, "exist (W, 右上 [upper right])" does not coincide with any, it is remained as it is, and an intermediate goal II 195, namely, "exist ( 図 [Figure], 左下 [lower left])"; exist (W, 右上 [upper right])" is generated.

In match substitution of the intermediate goal II and the current state 196, the coincidence of predicates is achieved. Hence, when " 文 [sentence]" is substituted for the variable W, the intermediate goal II becomes "exist ( 図 [Figure], 左下 [lower left]); exist ( 文 [sentence], 右上 [upper right])", and it shows that the intermediate goal II coincides with the current state. Thus, the deduction step 120 in FIG. 4 finishes.

Further, if a predicate " 左下 [lower left ]" is not contained in the input sentence 190, the predicate "左下 [lower left]" in each of the precondition 192A, intermediate goal I 193 and intermediate goal II 195 is "Y". In this case, even if " 左下 [lower left]" is substituted for "Y", no contradiction arises.

As described above, the procedure of the deduction processing means 120 is that, first, the goal state of the information terminal is recognized, and then, the intermediate goal state is determined from the above goal state, and finally the intermediate goal state is identified with the current state (backward deduction). On the contrary, the procedure of the deduction may be that the goal state is searched forwardly from the current state (forward deduction), which is described in "Principle of Artificial Intelligence" by Nils J. Nilsson, issued by McGraw-Hill Book Company in 1971.

Following the result of the deduction step 120, in the response sentence preparing step 130, the intermediate goals are followed in a reverse direction, and an instruction "after execution of delete ( 文 [sentence], 右上 [upper right]), execute the transfer ( 図 [Figure], 右上 [upper right])" is outputted to the input/output control device 11.

In accordance with the processing as described in the foregoing, if the user inputs a desired manipulation or input sentence in a natural language, a series of necessary command trains are displayed on the display unit 3. Hence, the user is only required to manipulate in accordance with the display, and the user can execute a desired operation without error and most efficiently.

Next, an embodiment relating to a method for realizing a goal state with negation will be described. In the plan generation (step 123) in FIG. 18, although methods such as TRRIPS (refer to aforementioned "Principle of Artificial Intelligence" by Nils J. Nilsson, issued by "McGraw-Hill Book Company in 1971) are known, for such a command to effect disappearance of a state, e.g., to erase a display on the display screen of the information terminal, the deduction can not be implemented. The embodiment improves the known technique. That is, in the embodiment, noticing that a state of the terminal disappears when the information terminal executes a command, when the state which disappears is to be achieved, it is designed to obtain a solution by tracing a list of states which disappear as a result of the execution of the command.

Figure 26A:
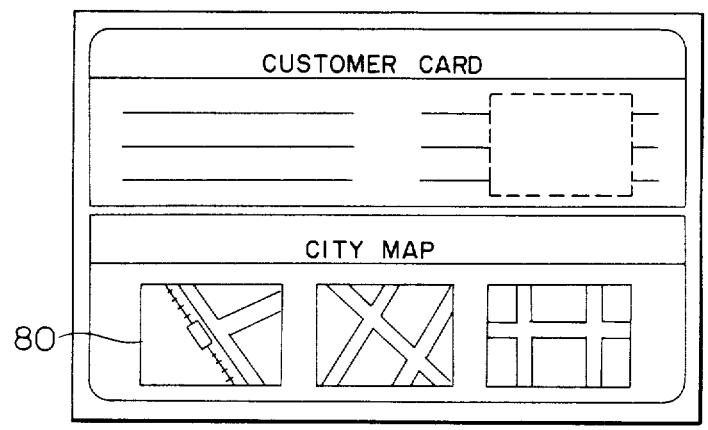
FIGS. 26A and 26B are front views of display screens showing examples of displays in the conventional information terminal.
Figure 26B:
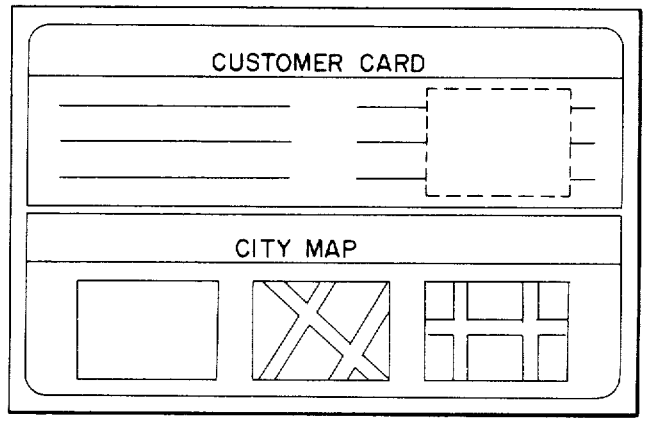
Figure 27:
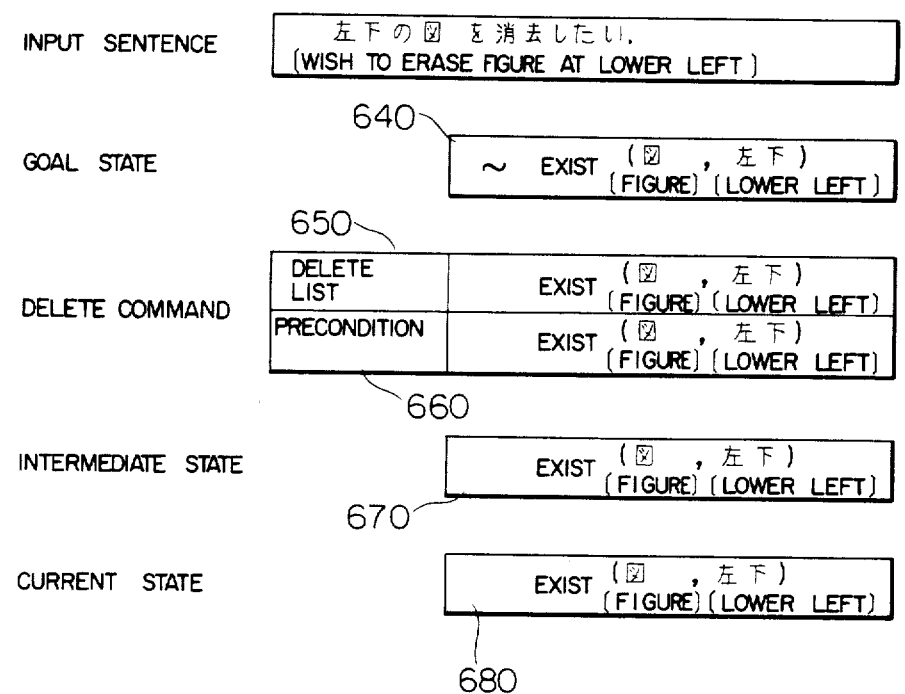
FIG. 27 is a state diagram for explaining a concrete example of the information terminal processing in the present invention.

Referring to FIGS. 26A and 26B, when the user wishes to erase FIG. 1 (80) at lower left of a city map in FIG. 26A and to obtain a state of FIG. 26B, and hence when the user inputs a question sentence, for example, as shown in FIG. 27, " 左下の ¥ を 消去したい [wish to erase Figure at lower left]", a goal state 640 in FIG. 27 is obtained as a result of analysis of Japanese language processing. This goal state means, according to a result of meaning processing, that a state in which Figure does not exist at lower left is sought, that is, the negation of a state in which Figure exists at lower left, and hence a negation symbol "∼" is placed before the predicate. The deduction is executed in the processing in FIG. 23, and when the procedure enters the processing in step 2501, since the negation symbol is present, the control is passed to the step 2502. As a result, making reference to a delete list in a rule base in FIG. 28, the match substitution are executed, and it is decided that it coincides with a delete list 650 of the delete command. From this precondition, a new intermediate state 670 is obtained in step 2322 in FIG. 24, and since it coincides with the current state 680, and it is determined that the delete command is to be executed.

Further, the history memory 160 in FIG. 4, as shown in FIG. 29, stores rules which have been applied to sequentially for each terminal, and stores states which have disappeared due to the application of the rules, and at the same time has a pointer 198 to indicate a position of a rule just before applied (newest rule).

Figure 30:
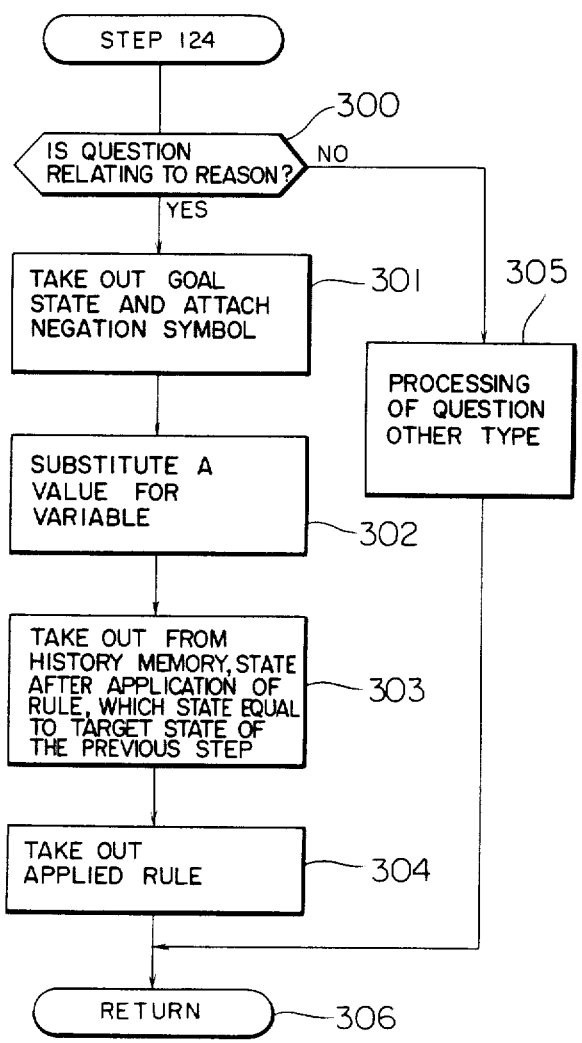
FIG. 30 is a flowchart showing a processing procedure of the history correlation.

FIG. 30 shows a processing procedure of the history match step, and the history match step includes the following processing procedures:

(a) Step 300 in which it is decided whether the question sentence relates to a reason or not, and if it relates to the reason, next step 301 is made to be executed, and if it does not relate to the reason, a step 305 is made to be executed.

(b) Step 301 in which a goal state is taken out from FIG. 31 (described later), and a negation symbol is attached to it.

(c) Step 302 in which a value is substituted for a variable of the goal state obtained in the step 301.

(d) Step 303 in which the states after application of the rules in the history memory are searched for in the order from new to old (the order of the states is made to be decremented by using a pointer as a reference) to find the state which is equal to the goal state obtained in the step 302.

(e) Step 304 in which by using the applied rule in the history memory obtained in the step 303, the reason is presented to the user.

(f) Step 305 in which procesing of the question other than the reason is carried out.

Figure 31:
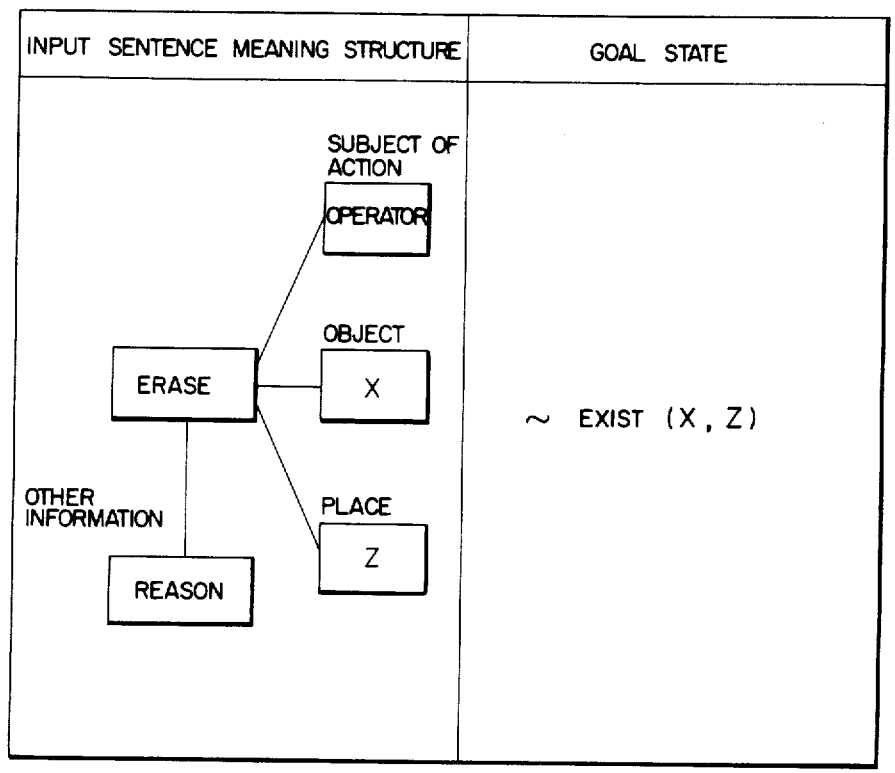
FIG. 31 shows an example of the memory content indicating a corresponding relationship between the input sentence meaning structure and the goal state.

FIG. 31 shows a content of the history memory indicating a correspondence between an input sentence meaning structure the same as the FIG. 21 and a goal state, in which an input sentence corresponds to " 何故右上の文が消えたのか [naze migiue no bun ga kie ta no ka: why sentence at upper right is erased]".

By arranging in such a manner, for example, in the step 122 in FIG. 18, when the user asks a question "何故右上の 文が 消えたのか [why sentence at upper right is erased]", in the sentence structure meaning analysis, passive voice is changed to active voice, and obtains an input sentence meaning structure shown in FIG. 31. The deduction means 120 (FIG. 4) executes the history match step 124 (the content of the processing is described in detail in FIG. 30) in FIG. 18.

In the step 124, since it is recognized that the question relates to a reason, the step 301 is executed. In the reason, it does not request a goal state to effect deletion but asks a command by which a negation of the goal state is deleted. Thus, in the step 301, as the goal state, "negation exist (X, Z)" is obtained. In the step 301, from the meaning of the input sentence, it is found that "X" corresponds to " 文 [sentence]", and "Z" corresponds to " 右上 [upper right]", and obtains "exist ( 文 [sentence], 右上[upper right])". In the step 303, the history memory in FIG. 29 is searched for "exist ( 文 [sentence], [upper right])". It is recognized from FIG. 29, that this state is "1". In the step 304, in the history memory of FIG. 29, applied rule "delete" is obtained, and it is possible to output (answer) as an answer that " それは 消去した ためである [because, it has been deleted]".

As described in the foregoing, the answer to a question of the user can be displayed on the display unit 3.

In accordance to the present invention, by merely inputting in a natural language a job which is desired to be executed by the information terminal, a command train to realize the job can be automatically generated. As a result, even when the user forgets the manner of using the terminal, or commits error in using it, the information terminal is prevented from becoming inoperable due to a deadlock in its operation, and further the desired job can be carried out efficiently with mininum procedures.

Further, according to the present invention, a state change of the manipulation object can be grasped in deduction processing, and at the same time, the deduction processing can be made with respect to a state which disappears. For this reason, similar to human who performs optimum guidance adapted to surrounding situations, in the present invention an optimum reply can be generated depending on a state of the manipulation object device.

Further, according to the present invention, addresses in a retrieval range of a dictionary memory are stored in an upper limit memory and a lower limit memory, and as the number of reference characters increases, the range can be narrowed gradually. In this way, since the range is narrowed in a simple manner, vocabularies of all lengths existing can be retrieved at high speeds. For this reason, higher efficiency of morphemic analysis for dividing an input character train into vocabulary units can be achieved.

In the course of one time of retrieval, the number of times of making reference to a dictionary is estimated, for a dictionary of 60,000 words, to be about 130 times in a conventional example, and to be about 60 times in the present invention. Further, as to the number of times of comparison of characters, since in a conventional example the comparison is made between vocabulary units, when it is counted in terms of character, the number of times is about 500 times. On the other hand, in the present invention, the comparison of characters is made as a unit of one character, and it is about 60 times. As will be seen from the above description, in the present invention, the number of times of making reference to a dictionary is reduced to about ½, and the number of times of comparison of character units is reduced to about 1/8, and thus a higher speed processing can be achieved.

Further, in the present invention, at the time when the forward analysis of a natural language character train reaches an undefined word portion, one time of analysis is carried out in a reverse direction, and a remaining portion is dealt with as an undefined word. Thus, there are advantages in that useless analysis can be avoided, and a processing time for dividing a natural language character train into unit words can be reduced to a great extent.

We claim:

1. An intelligent guidance system in a natural language having an information terminal comprising an input device, a processing device responsive to an input from said input device for performing a predetermined processing, and a display unit for displaying at least one of an identification of the processing operation and a processing result of said processing operation, wherein said processing device includes:
   input/output control means for controlling input of a natural language input sentence from said input device and output of data to said display unit;
   natural language analysis means for dividing said natural language input sentence composed of a character train into individual vocabularies, and for transforming each of the resultant individual vocabularies into an expression understandable by said processing device by analyzing the meaning of the input sentence;
   rule base means having a rule base for storing beforehand a state of said information terminal before execution and after execution of various input sentences;
   terminal state memory means for storing an operating state of said information terminal;
   deduction means connected to receive an output from said natural language analysis means for outputting a goal state of said information terminal, as a command train, based on the contents of said rule base; and
   plan memory means connected to said deduction means for storing said command train outputted from said deduction means.

2. A system according to claim 1, wherein said deduction means includes means for processing said goal state in accordance with a predetermined command, such that when a first intermediate goal does not coincide with a current state of said information terminal, the processing is changed to a second intermediate goal and when said second intermediate goal coincides with the current state of said information terminal, said deduction means outputs a command train to change said first and second intermediate goals.

3. A system according to claim 1, wherein said processing device further includes a history memory means for sequentially storing the state of said information terminal before a change thereof, when the content of said terminal state memory means changes by executing said command train, and wherein said plan memory stores said command train.

4. A system according to claim 3, wherein said deduction means includes:
   goal generation means for producing the goal state of said information terminal from the meaning structure of the input sentence;
   state update means for producing an intermediate goal state by adding to or depleting from said goal state an add formula and a precondition of said rule base; and
   match means for comparing said intermediate goal state with the current state of said information terminal stored in said terminal state memory means, and for outputting the add formula used to change said goal state as said command train when said intermediate goal state coincides with said goal state, and for actuating said state update means when said intermediate goal state does not coincide with said goal state, by regarding said intermediate state as a new goal state.

5. A system according to claim 3, wherein said rule base means stores a rule base having a precondition defining a condition required to execute said command train of said information terminal, a delete list describing information of said information terminal which disappears after the execution of said command train, and an add formula describing information which is added, and wherein said deduction means includes means for retrieving a state from said delete list, when a request is received for deleting a state of said information terminal for the purpose of deleting the state.

6. A system according to claim 1, wherein said deduction means includes:
   goal generation means for generating the goal state of said information terminal based on a meaning structure of the input sentence;
   state update means for generating an intermediate goal state by adding to or deleting from said goal state an add formula and a precondition of said rule base; and
   match means for comparing said intermediate goal state with the current state of said information terminal stored in said terminal state memory means, and for outputting the add formula used to change said goal state as said command train when said intermediate goal state coincides with said goal state, and for actuating said state update means when said intermediate goal state does not coincide with said goal state, by regarding said intermediate state as a new goal state.

7. A system according to claim 1, wherein said rule base means stores a rule base having a precondition defining a condition required to execute said goal state, a delete list describing information of said information terminal which disappears after the execution of said goal state, and an add formula describing information which is added; and wherein said deduction means includes means for retrieving a state from said delete list, when a request is received for deleting at least part of a current state of said information terminal.

8. A system according to claim 1, wherein said natural language analysis means includes:

a morphemic analysis device for dividing said character train into individual vocabularies, said morphemic analysis device including an input character train memory for storing said character train;

a dictionary means for storing a plurality of keywords corresponding to said plurality of individual vocabularies and for storing related information;

a start position memory for storing a start position of said character train for cutting out a particular one of said plurality of vocabularies from said character train;

a character train comparison section for comparing contents of said dictionary memory with said character train from the start position of said character train;

a control section for controlling contents of said start position memory;

a character position memory for storing a position of said character train to be compared with the contents of said dictionary, based on an n-th character from said start point;

an upper limit memory for indicating a first address among the addresses in which characters from the first to (n−1)-the character in a keyword from the dictionary are equal to characters from the start position to the (n−1)-th character in said character train;

a lower limit memory indicating a final address; and vocabulary cut out means for storing in said upper limit memory and said low limit memory a range of addresses of characters equal to an input character indicated by said character position memory and for cutting out a vocabulary.

9. A system according to claim 8, further including first means for detecting when the contents of said upper limit memory and said lower limit memory coincide with each other and for producing an output indicating that the current output of the vocabulary has finished, and second means responsive to the output of said first means for updating said start position memory.

10. A system according to claim 8 wherein with respect to a vocabulary indicated by the upper limit memory, when no corresponding next character is contained in said character position memory, said vocabulary is outputted.

11. A system according to claim 1 wherein an algorithm for retrieving vocabularies is based on a binary search method.

12. A method of intelligent guidance in a natural language for use in an intelligent guidance system having an information terminal including an input device, a processing device responsive to an input from said input device for performing a predetermined processing, and a display unit for displaying at least one of an identification of the processing operation and a processing result of said processing operation, wherein said processing device includes an input/output control device for controlling the input from said input device and the output to said display unit, and a natural language analysis means for dividing the natural language composed of a character train into a plurality of vocabularies, and by analyzing the characters and the meaning of the input sentence, for transforming said plurality of vocabularies into a machine expression understandable by said processing device, said method comprising the steps of:

(a) analyzing the inputted natural language composed of a character train;

(b) recognizing a goal state of said information terminal desired by an operator;

(c) obtaining an intermediate goal state by processing said goal state by a predetermined command;

(d) ascertaining that said intermediate goal state is equal to a current state of said information terminal; and (e) changing said goal state to said intermediate goal state, and executing the predetermined command reversely.

13. A method according to claim 12, wherein said method further comprises a step of storing a state change of said information terminal, and storing the command executed at a given time so that this command and the state change are stored in a corresponding relationship with each other, and a history relating to said information terminal is outputted.

14. A method of dividing a natural language character train into unit words in an intelligent guidance system in a natural language, said intelligent guidance system having an information terminal including an input device, a processing device responsive to an input of a natural language character train forming an input sentence from said input device for performing a predetermined processing, and a display unit for displaying at least one of an identification of the processing operation and a processing result of said processing operation, said processing device including an input/output control device for controlling the input from said input device and an output to said display unit, and a natural langauge analysis means for dividing the natural language character train into a plurality of vocabularies, and by analyzing the meaning of the input sentence, for transforming the vocabularies into an internal expression understandable by said processing device, wherein the inputted natural language character train including an undefined word is character encoded, and the character encoded natural language character train is analyzed in a forward direction making reference to a unit word dictionary consisting of a key character train for a natural language unit word and its parts of speech and making reference to a conjunction matrix indicating the propriety of conjunction between natural language parts of speech, and the natural language character train is divided into unit words, said method comprising the steps of:

(a) preparing a reverse unit word dictionary in which the order of the key character train in said unit word dictionary is reversed, and a reverse conjuction matrix consisting of a transposed matrix of said conjunction matrix is provided;

(b) analyzing in a reverse direction an unanalyzed portion of said character encoded natural language character train making reference to said reverse unit word dictionary and said reverse conjunction matrix when said analysis in the forward direction becomes impossible; and (c) extracting the undefined word in said natural language character train based on the result of the analysis in the forward direction and in the reverse direction.

* * * * *